United States Patent
Yakame et al.

(10) Patent No.: US 11,157,054 B2
(45) Date of Patent: Oct. 26, 2021

(54) CONTROL DEVICE, INFORMATION PROCESSING SYSTEM, AND COMPUTER PROGRAM PRODUCT

(71) Applicant: FUJITSU CLIENT COMPUTING LIMITED, Kanagawa (JP)

(72) Inventors: Hirotaka Yakame, Kawasaki (JP); Taketoshi Hayashi, Osaka (JP)

(73) Assignee: FUJITSU CLIENT COMPUTING LIMITED, Kanagawa (JP)

( * ) Notice: Subject to any disclaimer, the term of this patent is extended or adjusted under 35 U.S.C. 154(b) by 57 days.

(21) Appl. No.: 16/848,199

(22) Filed: Apr. 14, 2020

(65) Prior Publication Data

US 2020/0278731 A1    Sep. 3, 2020

Related U.S. Application Data

(63) Continuation of application No. 16/796,186, filed on Feb. 20, 2020, now Pat. No. 11,003,228.

(30) Foreign Application Priority Data

Feb. 28, 2019  (JP) .............................. JP2019-036445
Feb. 28, 2019  (JP) .............................. JP2019-036446
(Continued)

(51) Int. Cl.
  *G06F 1/26*  (2006.01)
  *G06F 1/28*  (2006.01)
(Continued)

(52) U.S. Cl.
  CPC ............... *G06F 1/266* (2013.01); *G06F 1/28* (2013.01); *G06F 1/3212* (2013.01);
(Continued)

(58) Field of Classification Search
  CPC .......... G06F 1/1632; G06F 1/26; G06F 1/266; G06F 1/28; G06F 1/3212; G06F 1/322
  See application file for complete search history.

(56) References Cited

U.S. PATENT DOCUMENTS

| 6,421,782 B1 | 7/2002 | Yanagisawa et al. |
| 2003/0109243 A1 | 6/2003 | Chang et al. |
| (Continued) | | |

FOREIGN PATENT DOCUMENTS

| JP | 2015-174377 A | 10/2015 |
| JP | 2018-535645 A | 11/2018 |
| WO | 2018/096798 A1 | 5/2018 |

OTHER PUBLICATIONS

Office Action issued in the counterpart British Patent Application No. GB2004564.7, dated Sep. 28, 2020 (4 pages).
(Continued)

*Primary Examiner* — Terrell S Johnson
(74) *Attorney, Agent, or Firm* — Osha Bergman Watanabe & Burton LLP

(57) ABSTRACT

A terminal device serves as a computer portable by a user and includes: a power supply controller that is connected to a device via a cable and supplied with power from the device, and communicates information with the device via the cable; a wireless communicator that is wirelessly connected to an access point to communicate information via a network; and an access-point controller that causes, when connected to a predefined control device via the cable, the wireless communicator to wirelessly connect to a first access point associated with the control device.

6 Claims, 20 Drawing Sheets

(30) Foreign Application Priority Data

Feb. 28, 2019 (JP) .............................. JP2019-036560
Feb. 28, 2019 (JP) .............................. JP2019-036561
Feb. 28, 2019 (JP) .............................. JP2019-036571

(51) Int. Cl.
*G06F 1/3212* (2019.01)
*G06F 1/3228* (2019.01)
*G06F 1/16* (2006.01)

(52) U.S. Cl.
CPC .......... *G06F 1/3228* (2013.01); *G06F 1/1632* (2013.01); *G06F 1/26* (2013.01)

(56) References Cited

U.S. PATENT DOCUMENTS

| | | | |
|---|---|---|---|
| 2011/0069640 A1* | 3/2011 | Di Fiore | G06F 1/266 370/254 |
| 2011/0271122 A1 | 11/2011 | King | |
| 2013/0145186 A1 | 6/2013 | Chu et al. | |
| 2014/0239883 A1 | 8/2014 | Hobson et al. | |
| 2015/0382194 A1* | 12/2015 | Kang | H04W 76/30 370/338 |
| 2017/0083068 A1 | 3/2017 | Kashyap et al. | |
| 2017/0085389 A1* | 3/2017 | Yun | H04W 76/10 |

OTHER PUBLICATIONS

Office Action issued in corresponding Great Britain Patent Application No. 2001304.1 dated Jul. 7, 2020 (4 pages).
Notification of Reasons for Refusal issued in corresponding Japanese Patent Application No. 2019-036560, dated Jun. 25, 2019 (7 pages).
Office Action issued in the counterpart British Patent Application No. 2004563.9, dated Sep. 24, 2020 (4 pages).
Office Action issued in the counterpart British Application No. 2004562.1, dated Sep. 10, 2020 (4 pages).

* cited by examiner

CONTROL DEVICE, INFORMATION PROCESSING SYSTEM, AND COMPUTER PROGRAM PRODUCT

CROSS-REFERENCE TO RELATED APPLICATIONS

This application is based upon and claims the benefit of priority from Japanese Patent Application No. 2019-036571, No. 2019-036560, No. 2019-036561, No. 2019-036445, No. 2019-036446, all filed Feb. 28, 2019, the entire contents of which are incorporated herein by reference.

FIELD

Embodiments described herein relate generally to a control device, an information processing system, and a computer program product.

BACKGROUND

In recent years, education-purpose use of a tablet computer (hereinafter, referred to as a tablet) in schools has been studied. In such a case, tablets are stored and managed in a dedicated rack installed in a classroom, for example. Before start of a class, each student takes out a tablet from the rack, and boots the tablet at his or her own desk for use. After the class ends, the students shut down their tablets, store them in the rack, and connect the tablets to a control device inside the rack via a cable.

The control device in the rack serves to charge the tablets via the cable. An information processing device is installed in the rack to update software of the tablets for maintenance in accordance with remote control via a network, for example.

At the start of maintenance of the tablet, the control device in the rack turns on the power switch of each tablet in response to a command from a high-order information processing device. After the end of the maintenance, the control device in the rack turns off the power switch of the tablet in response to a command from the high-order information processing device.

However, the power switch of the tablet serves as a push switch that alternately operates, so that it typically uses the same signal for turning on and off the power switch. Thus, in response to receipt of a command for turning off the power switch from the high-order information processing device during shutdown of the tablet, the control device turns on the power switch of the tablet. In response to receipt of a command for turn on the power switch from the high-order information processing device while the tablet runs, the control device turns off the power switch of the tablet.

SUMMARY

According to one aspect of this disclosure, a control device controls power supply to a terminal device. The control device includes a power supply controller that is connectable to the terminal device via a cable, the power supply controller that supplies power to the terminal device and communicates information with the terminal device via the cable; a power-command acquirer that receives a wake-up command from an information processing device, the wake-up command serving to boot the terminal device; a power-switch controller that instructs the power supply controller to output a switch-push signal to the terminal device, in response to receipt of the wake-up command, the switch-push signal serving to switch a state of a power switch of the terminal device; and a power-command mask that masks the wake-up command, in response to receipt of the wake-up command during a running state of the terminal device.

DETAILED DESCRIPTION

Figure 1:
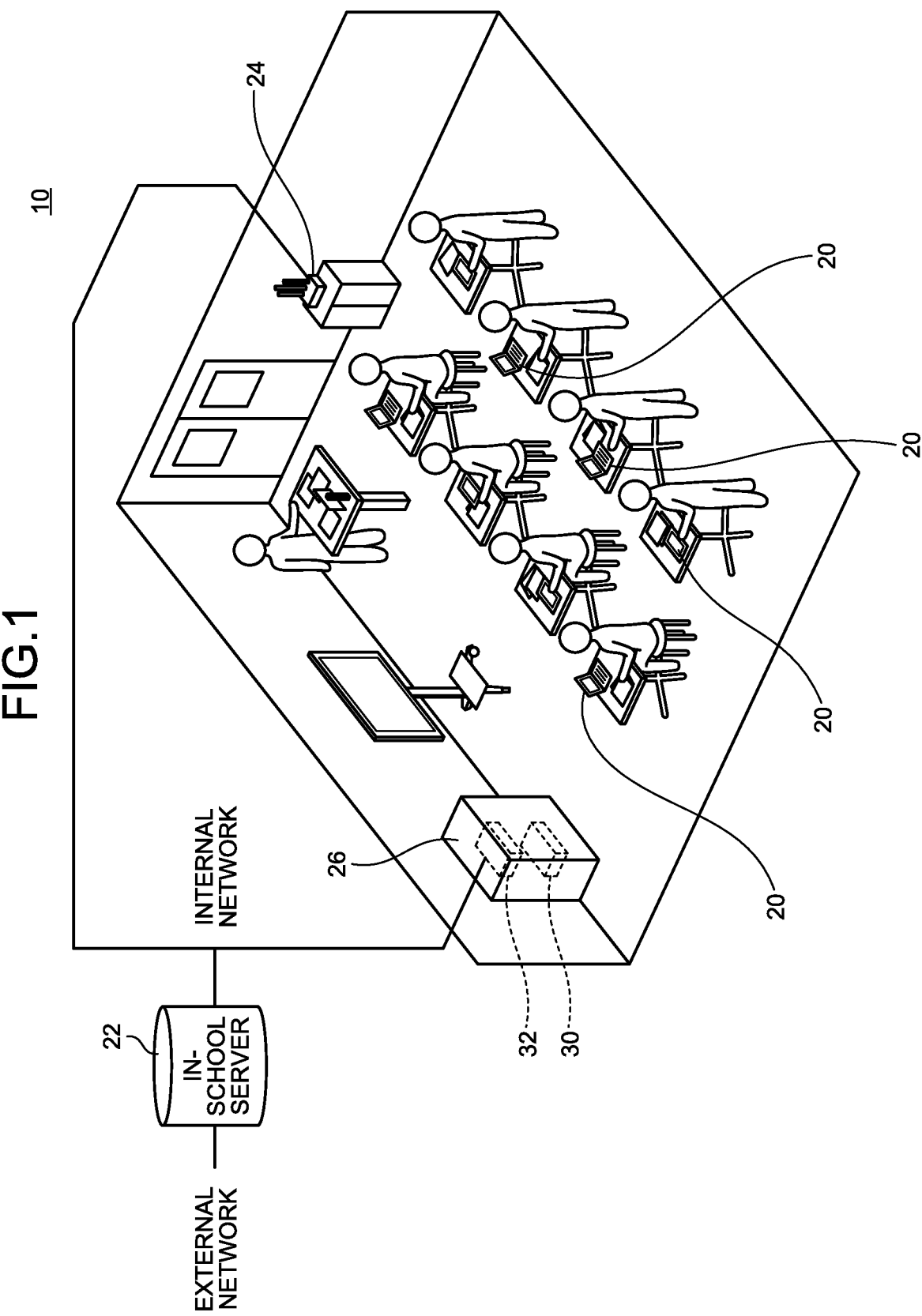
FIG. 1 is a diagram illustrating an information processing system by way of example.

The following will describe an information processing system 10 according to embodiments. The embodiments are merely exemplary and are not intended to limit the scope of this disclosure. Throughout the embodiments, elements having same or like functions are denoted by same or like reference numerals, and redundant description will not be repeated.

First Embodiment

First, the information processing system 10 according to a first embodiment is described.

FIG. 1 is a diagram illustrating the information processing system 10 of the first embodiment. In the present embodiment, the information processing system 10 serves as a teaching aid system at school. The information processing system 10 may be applicable to different environments, in addition to teaching aid in a school. For example, the information processing system 10 may be applied to any environment such as in a company, a seminar, or a conference as long as a large number of participants work or learn with a computer.

The information processing system 10 includes a plurality of terminal devices 20, an in-school server 22, a wireless communication device 24, and a charging cabinet 26.

Each of the terminal devices 20 serves as a tablet computer or a laptop computer. The terminal device 20 includes an information input/output function and an information processing function. The terminal device 20 includes a secondary battery, and is operable by electric power charged in the secondary battery. Thus, the terminal device 20 can be carried by a user. The terminal device 20 also includes a wireless communication function, and can communicate information with other devices without a communication cable.

The in-school server 22 serves as a server computer, and is accessed by the terminal devices 20 via an internal network. For example, the in-school server 22 limits access from devices on an external network to devices on the internal network, or from devices on the internal network to devices on the external network.

The wireless communication device 24 is located outside the charging cabinet 26. The wireless communication device 24 is in wired connection to the internal network. The wireless communication device 24 is connected to each of the terminal devices 20 via wireless communication. The wireless communication device 24 causes the wirelessly connected terminal device 20 to access another device on the internal network.

The charging cabinet 26 accommodates the terminal devices 20. Users can extract the terminal devices 20 from the charging cabinet 26.

The charging cabinet 26 charges the terminal devices 20 stored therein. The charging cabinet 26 can boot or shut down the terminal devices 20. The charging cabinet 26 can communicate with the terminal devices 20 in a wired manner. Additionally, the charging cabinet 26 can wirelessly communicate with the terminal devices 20 while running.

The charging cabinet 26 is also connected to the internal network. The charging cabinet 26 can operate or communicate with the terminal devices 20 in response to an instruction from an external device.

Such an information processing system 10 works as follows. Before start of a class, students take out the terminal devices 20 from the charging cabinet 26. During the class, students use the terminal devices 20, and the terminal devices 20 access the in-school server 22 via the wireless communication device 24. Thereby, the terminal devices 20 can download material data from the in-school server 22 to be referred to by the students during the class. Additionally, during the class, the terminal device 20 can upload information input by the students (for example, an answer to a question) into the in-school server 22.

Each of the terminal devices 20 is stored in the charging cabinet 26 after the end of the class. The charging cabinet 26 charges the stored terminal device 20 before start of the next class. Thus, the charging cabinet 26 can prevent the terminal devices 20 from running out of power and becoming inoperable during the class.

The charging cabinet 26 causes the stored terminal devices 20 to operate under the remote control of an external device. The charging cabinet 26 causes the stored terminal device 20 to update or install a computer program under remote control of an external device. Thereby, the charging cabinet 26 allows a maintenance worker in a remote location to perform maintenance of the terminal devices 20.

Figure 2:
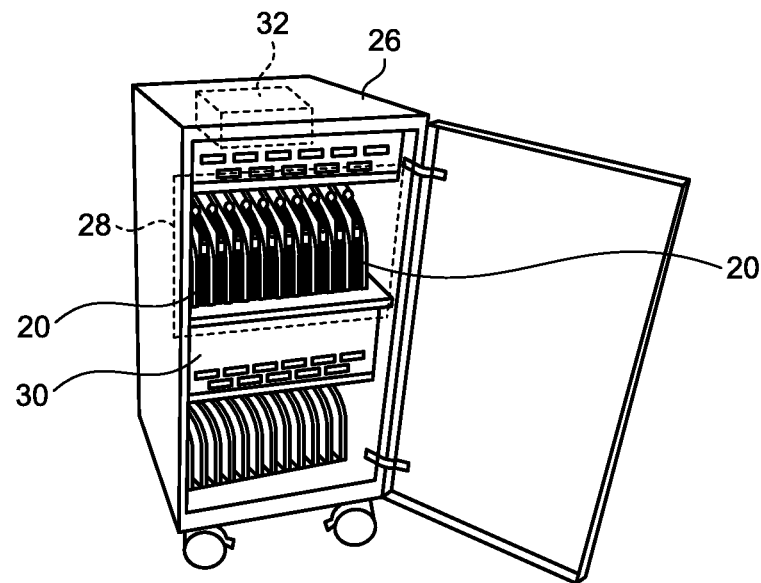
FIG. 2 is a diagram illustrating external appearance of an exemplary charging cabinet.

FIG. 2 is a diagram illustrating the external appearance of the charging cabinet 26 by way of example. The charging cabinet 26 includes a storage area 28 inside. Each of the terminal devices 20 is placed in a given position in the storage area 28.

The charging cabinet 26 further includes a charge control device 30 and an information processing device 32. The charge control device 30 controls charging and communication over the terminal devices 20. The information processing device 32 communicates with other devices via the internal network. The information processing device 32 controls the charge control device 30, and wirelessly communicates with the stored terminal devices 20.

Figure 3:
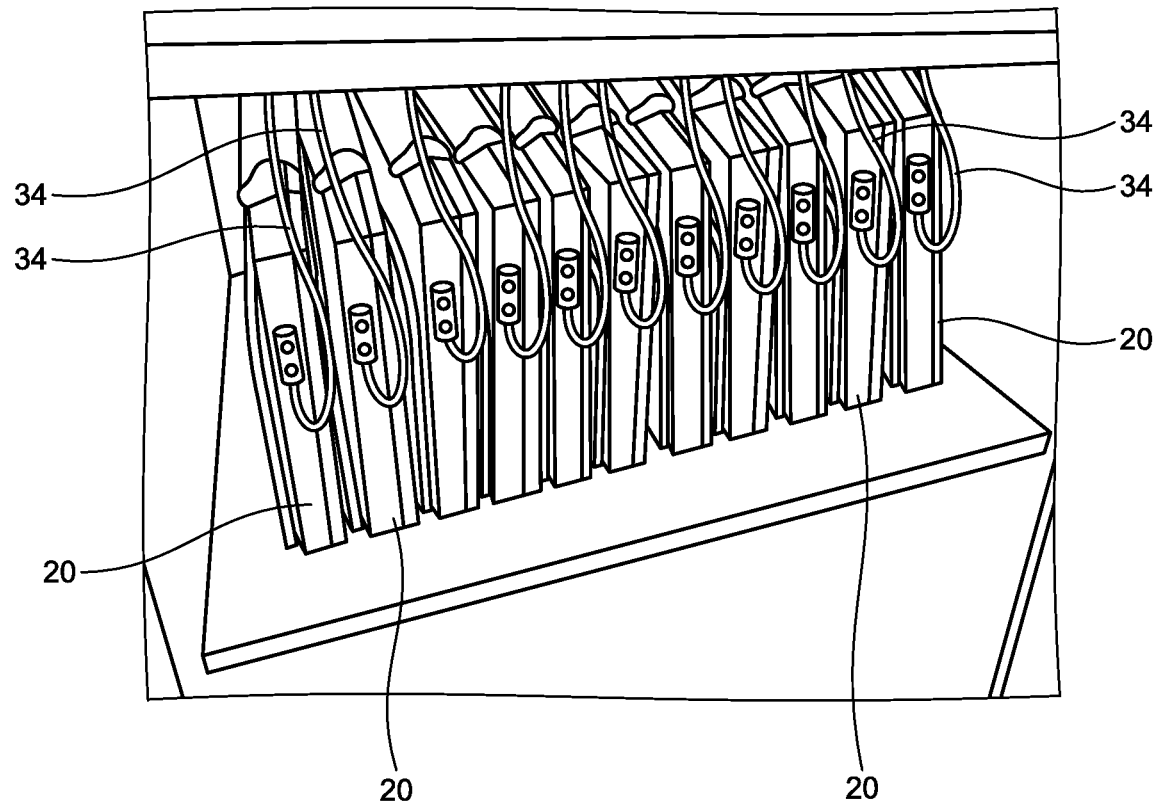
FIG. 3 is an enlarged view of the periphery of a terminal device contained in the charging cabinet.

FIG. 3 is an enlarged view of the periphery of the terminal devices 20 stored in the charging cabinet 26. Inside the charging cabinet 26, the terminal devices 20 are connected to the charge control device 30 via cables 34.

The cables 34 are detachable from the terminal devices 20. For storing, users manually attach the terminal devices 20 to the cables 34. For extraction, users manually detach the terminal devices 20 from the cables 34.

The cables 34 conform to a standard that defines specifications for power supply and information and communications between two devices. In the present embodiment, the cables 34 are USB Type-C cables conforming to a Universal Serial Bus (USB)-C standard. Under this standard, power supply and communications of information are feasible between two devices.

Figure 4:
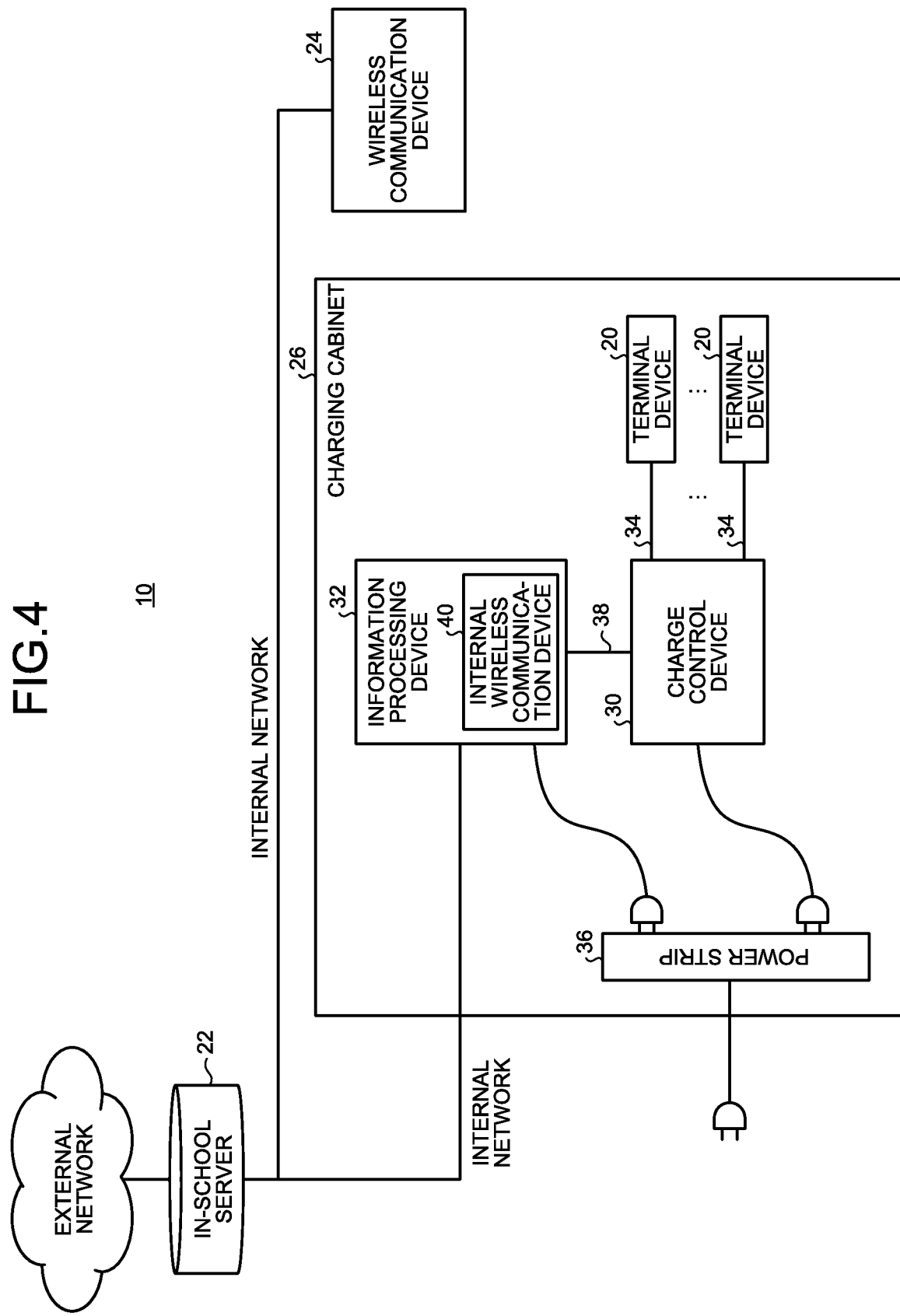
FIG. 4 is a block diagram illustrating an exemplary configuration of the charging cabinet containing terminal devices together with an in-school server and a wireless communication device.

FIG. 4 is a block diagram illustrating an exemplary configuration of the charging cabinet 26 storing the terminal devices 20 together with the in-school server 22 and the wireless communication device 24. The charging cabinet 26 includes the charge control device 30, the information processing device 32, the cables 34, and a power strip 36.

The charge control device 30 is connected to the one or more terminal devices 20 via the one or more cables 34. One end terminal of each of the cables 34 is connected to the charge control device 30 while the other end terminal can be connected to the terminal device 20.

The charge control device 30 controls charging and communication over each of the one or more terminal devices 20. The configuration of the charge control device 30 will be described later in more detail with reference to FIG. 10 and the subsequent drawings.

The information processing device 32 serves as a computer including a communication function and an information processing function. The information processing device 32 is connected to the internal network to communicate information with other devices on the internal network. The information processing device 32 communicates information with other devices on the external network via the in-school server 22.

The information processing device 32 is connected to the charge control device 30 via an internal communication cable 38. Thereby, the information processing device 32 can control the charge control device 30.

The internal communication cable 38 connects between the information processing device 32 and the charge control device 30. The internal communication cable 38 is a USB Type-A to C cable conforming to the USB-C standard. The internal communication cable 38 is not limited thereto, and may be a cable conforming to another standard.

The information processing device 32 includes an internal wireless communication device 40. The internal wireless communication device 40 is connected to the one or more terminal devices 20 stored in the charging cabinet 26 via wireless communication. Thus, the information processing device 32 can transmit/receive information to/from each of the one or more terminal devices 20 stored in the charging cabinet 26 via wireless communication. The internal wireless communication device 40 may be located inside or outside the information processing device 32.

The power strip 36 is connected to a commercial AC power receptacle in a classroom via an AC cable. The power strip 36 includes a plurality of sub-power receptacles. The sub-power receptacles of the power strip 36 is connected to an AC cable for AC power supply to the information processing device 32. Thus, the information processing device 32 can operate by AC power as a power source.

The sub-power receptacle of the power strip 36 are connected to an AC cable for AC power supply to the charge control device 30. That is, the charge control device 30 can operate by AC power as a power source. The charge control device 30 and the information processing device 32 may receive DC power from an AC adapter that converts AC power into DC power.

Figure 5:
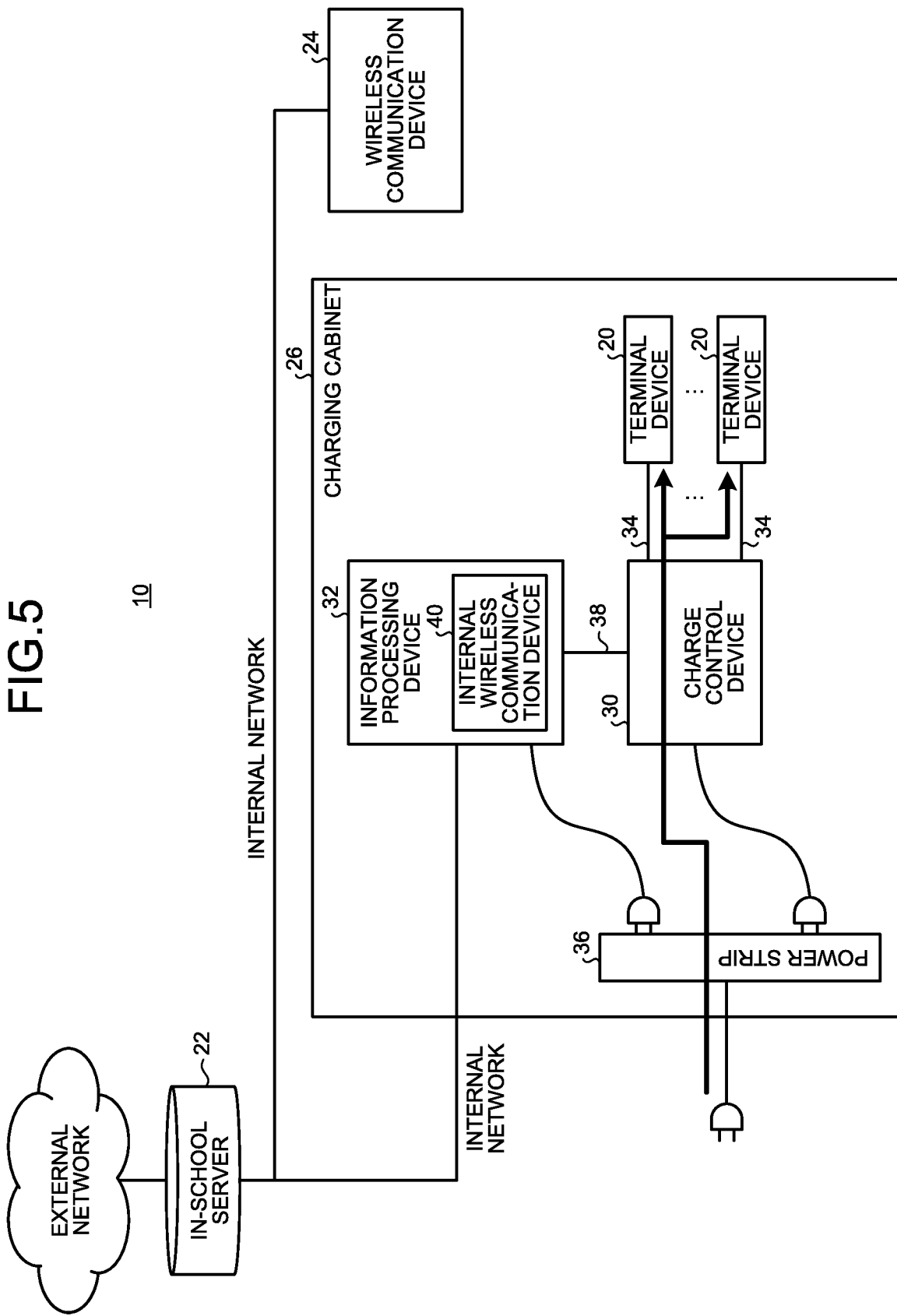
FIG. 5 is a diagram illustrating a flow of power supply to the terminal device.

FIG. 5 is a diagram illustrating a flow of power supply to the terminal devices 20 stored in the charging cabinet 26. The charge control device 30 receives electric power from the commercial AC power receptacle, and supplies DC power to the terminal device 20 connected to the cable 34.

The charge control device 30 can change a combination of a voltage and a current to be supplied to the one or more terminal devices 20 connected to the cable 34 under the control of the information processing device 32. Thereby, the charge control device 30 can supply electric power to the terminal devices 20 within an available power range of the commercial AC power receptacle. The charge control device 30 may also charge part of the terminal devices 20 in order under the control of the information processing device 32.

Figure 6:
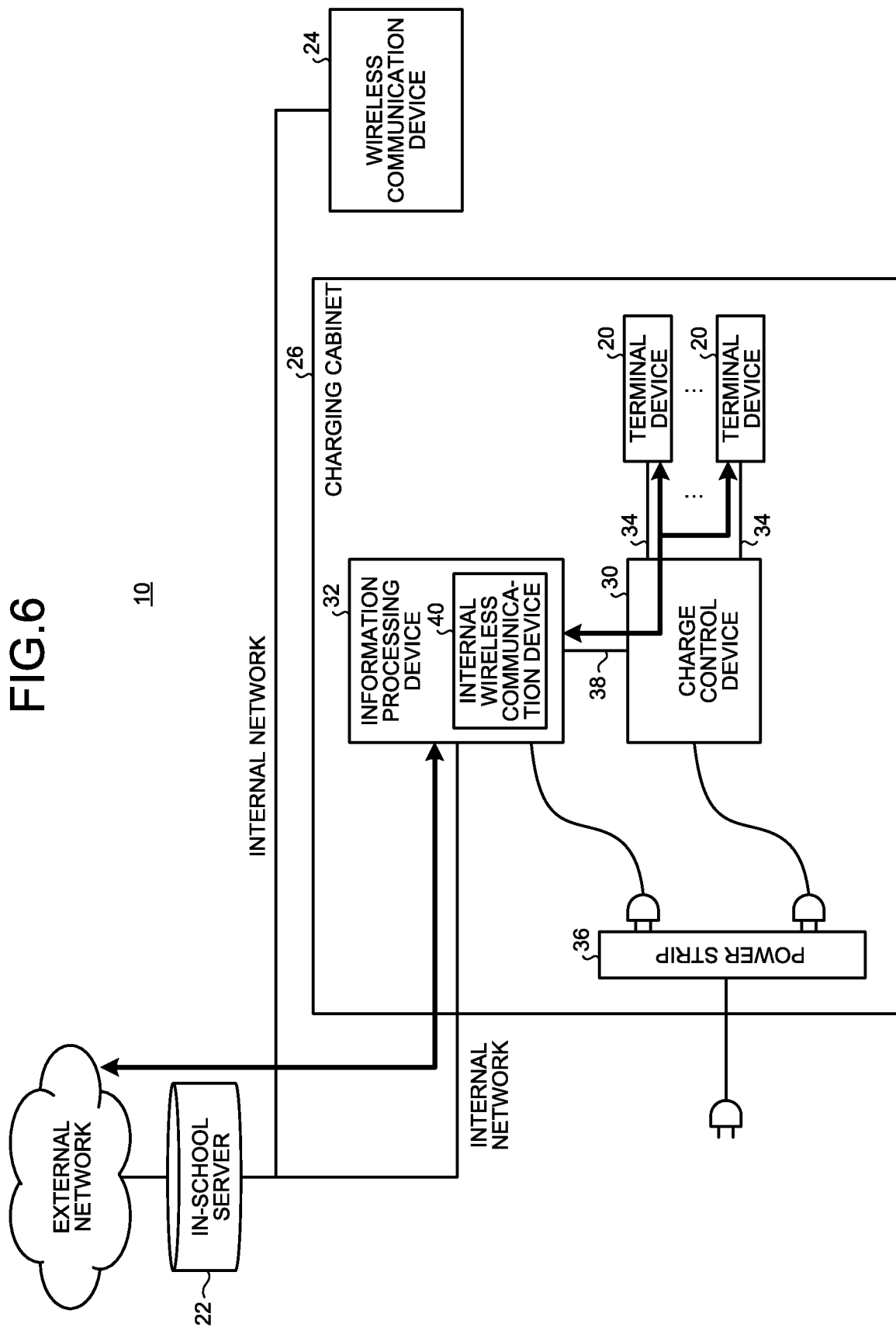
FIG. 6 is a diagram illustrating a flow of information when an information processing device controls the terminal device via a cable by way of example.

FIG. 6 is a diagram illustrating a flow of information when the information processing device 32 controls the terminal device 20 while stored in the charging cabinet 26 via the cable 34.

The information processing device 32 gives various commands to the charge control device 30 via the internal communication cable 38. Thereby, the information processing device 32 can control the operation of the one or more terminal devices 20 connected to the cable 34. The information processing device 32 receives various notifications from the charge control device 30 via the internal communication cable 38. Thereby, the information processing device 32 can detect statuses of the one or more terminal devices 20 connected to the cable 34.

Figure 7:
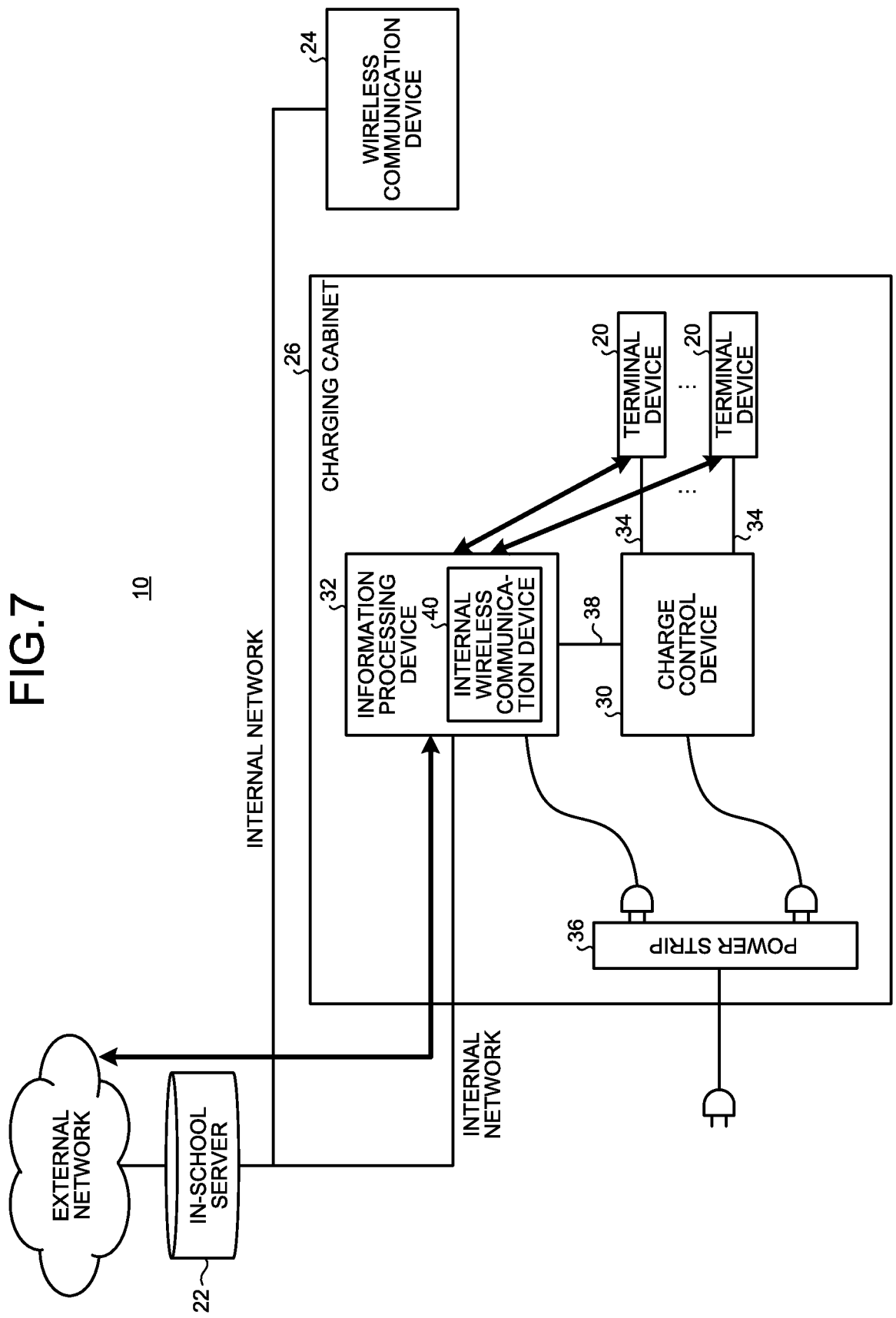
FIG. 7 is a diagram illustrating a flow of information when the information processing device transmits/receives the information to/from the terminal device via wireless communication.

FIG. 7 is a diagram illustrating a flow of information when the information processing device 32 transmits/receives information to/from the terminal devices 20 stored in the charging cabinet 26 via wireless communication.

While the terminal devices 20 stored in the charging cabinet 26 are running, the internal wireless communication device 40 of the information processing device 32 provides a wireless-communication access point (first access point) to the terminal devices 20. The information processing device 32 can transmit/receive information to/from the terminal devices 20 in the charging cabinet 26 via the first access point.

The information processing device 32 can download data from another device on the external network, and transmit the downloaded data to the terminal devices 20 in the charging cabinet 26 via the first access point. Thus, the information processing device 32 can cause the terminal device 20 to install or update a computer program.

Figure 8:
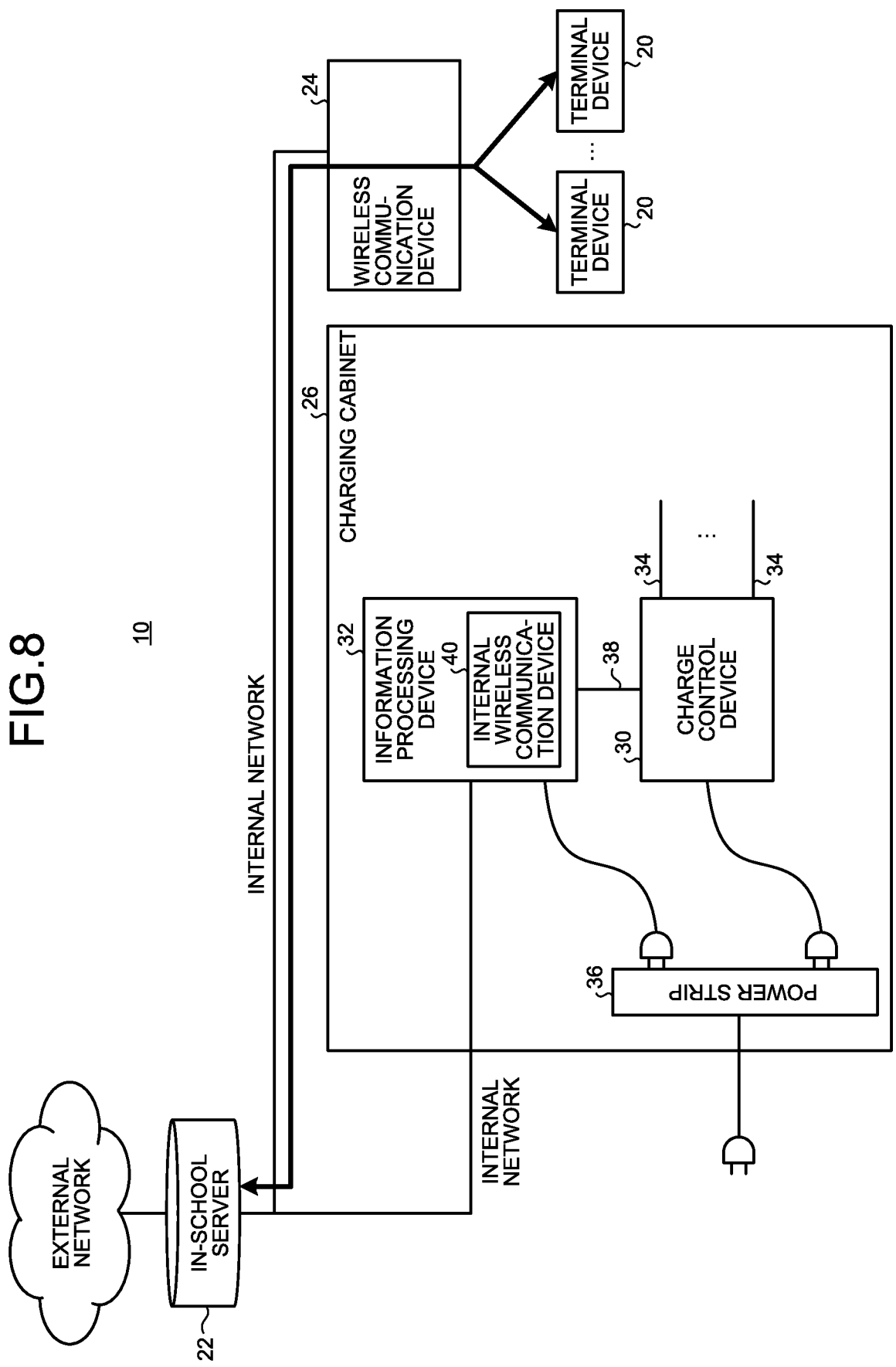
FIG. 8 is a diagram illustrating a flow of information when the terminal device accesses the in-school server.

FIG. 8 is a diagram illustrating a flow of information when the terminal device 20, while located outside the charging cabinet 26, accesses the in-school server 22.

While located outside the charging cabinet 26, the terminal device 20 is wirelessly connected to an access point (second access point) provided by the wireless communication device 24. The wireless communication device 24 is located outside the charging cabinet 26 unlike the internal wireless communication device 40. Thus, outside the charging cabinet 26, the terminal device 20 can be connected to the in-school server 22 on the internal network via the second access point outside the charging cabinet 26.

Figure 9:
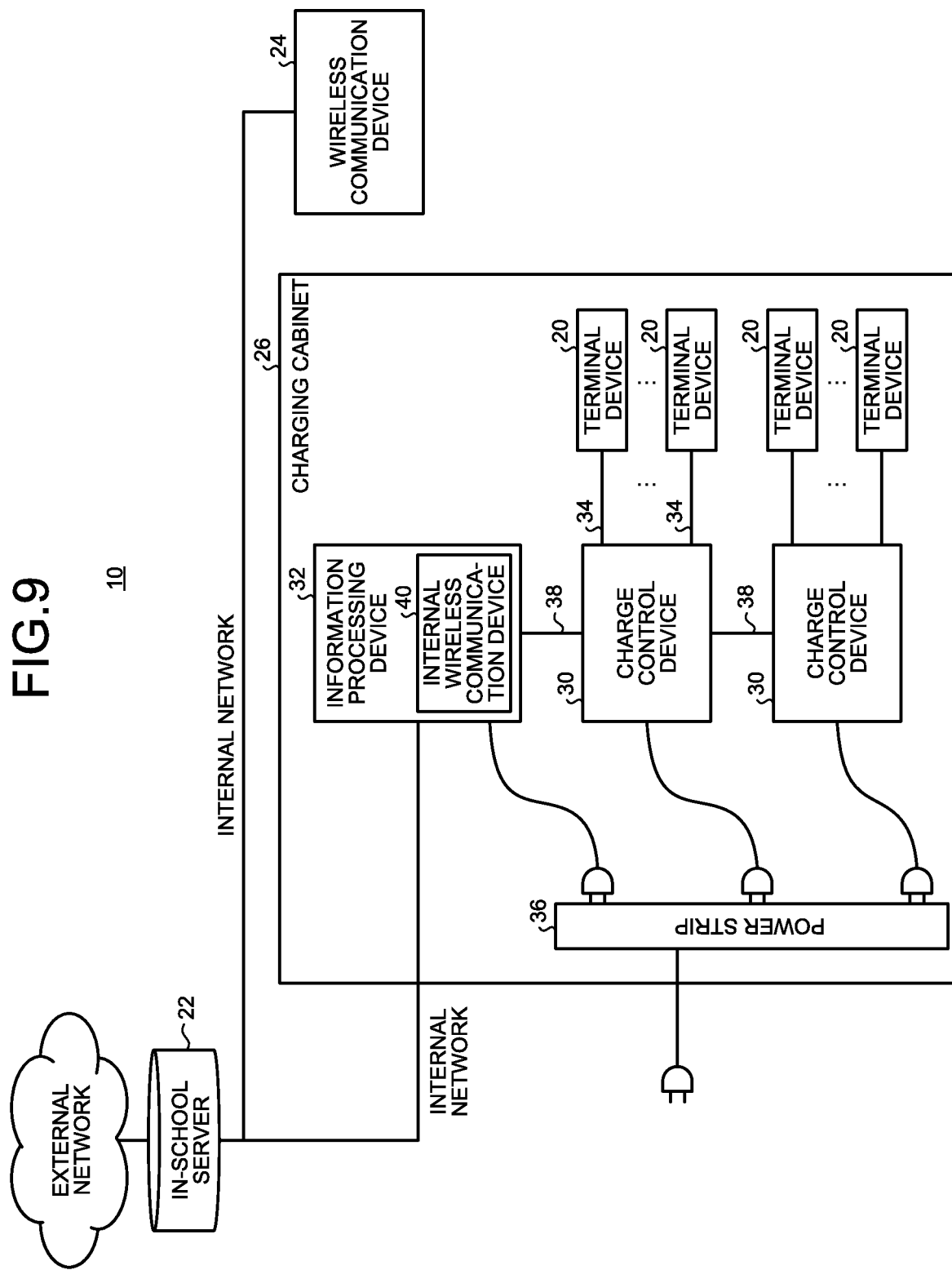
FIG. 9 is a diagram illustrating an exemplary configuration of a charging cabinet including a plurality of charge control devices.

FIG. 9 is a diagram illustrating an exemplary configuration of a charging cabinet 26 including a plurality of charge control devices 30. The charging cabinet 26 may include two or more charge control devices 30. In the present embodiment, the charge control devices 30 are connected in cascade via the internal communication cable 38. The information processing device 32 may be individually or in parallel connected to the charge control devices 30.

Figure 10:
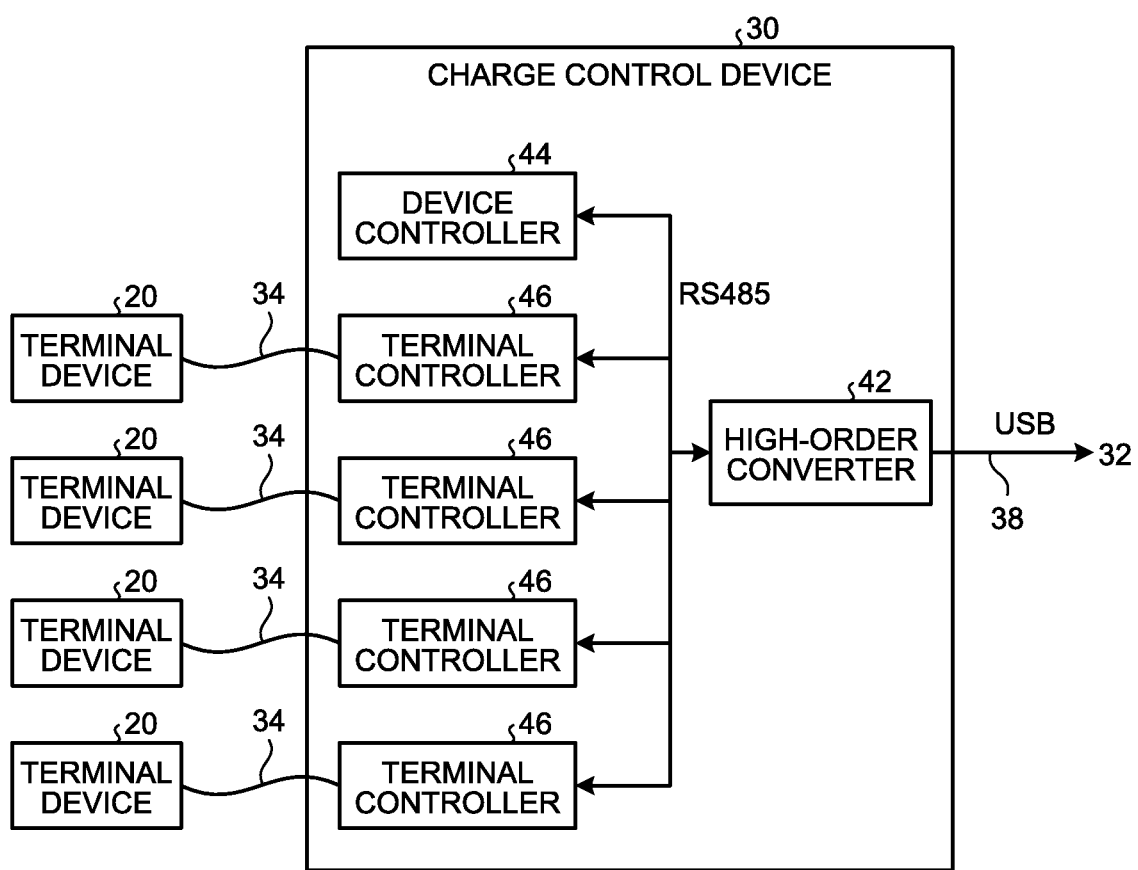
FIG. 10 is a diagram illustrating an exemplary hardware configuration of the charge control device together with a plurality of terminal devices.

FIG. 10 is a diagram illustrating an exemplary hardware configuration of the charge control device 30 together with the terminal devices 20. The charge control device 30 includes a high-order convertor 42, a device controller 44, and a plurality of terminal controllers 46.

The high-order convertor 42 is connected to the information processing device 32 via the internal communication cable 38. The high-order convertor 42 converts a signal format between a signal line of the internal communication cable 38 and input/output signal lines of the device controller 44 and the terminal controllers 46.

In the present embodiment, the device controller 44 and the terminal controllers 46 input or output a signal of RS485 format. Thus, in the present embodiment, the high-order convertor 42 converts a signal format between the USB-C and the RS485.

In the case of the device controller 44 and the terminal controllers 46 inputting or outputting a USB-C signal, the charge control device 30 may not include the high-order convertor 42. The high-order convertor 42 may convert the signal format into another format other than the RS485.

The device controller 44 includes a processor circuit inside. The device controller 44 controls the charge control device 30 as a whole.

The terminal controllers 46 can be connected to the terminal device 20 via the cables 34, respectively. The terminal controllers 46 control charging and communication over the respective terminal devices 20 in connection via the corresponding cables 34. Each of the terminal controllers 46 may be connected to two or more terminal devices 20 via two or more cables 34.

Each of the terminal controllers 46 receives a command from the information processing device 32 via the high-order convertor 42. Each of the terminal controllers 46 can also control charging and communication in response to the command from the information processing device 32. Each of the terminal controllers 46 notifies, via the high-order convertor 42, the information processing device 32 of a state of the terminal device 20 in connection via the corresponding cable 34.

Figure 11:
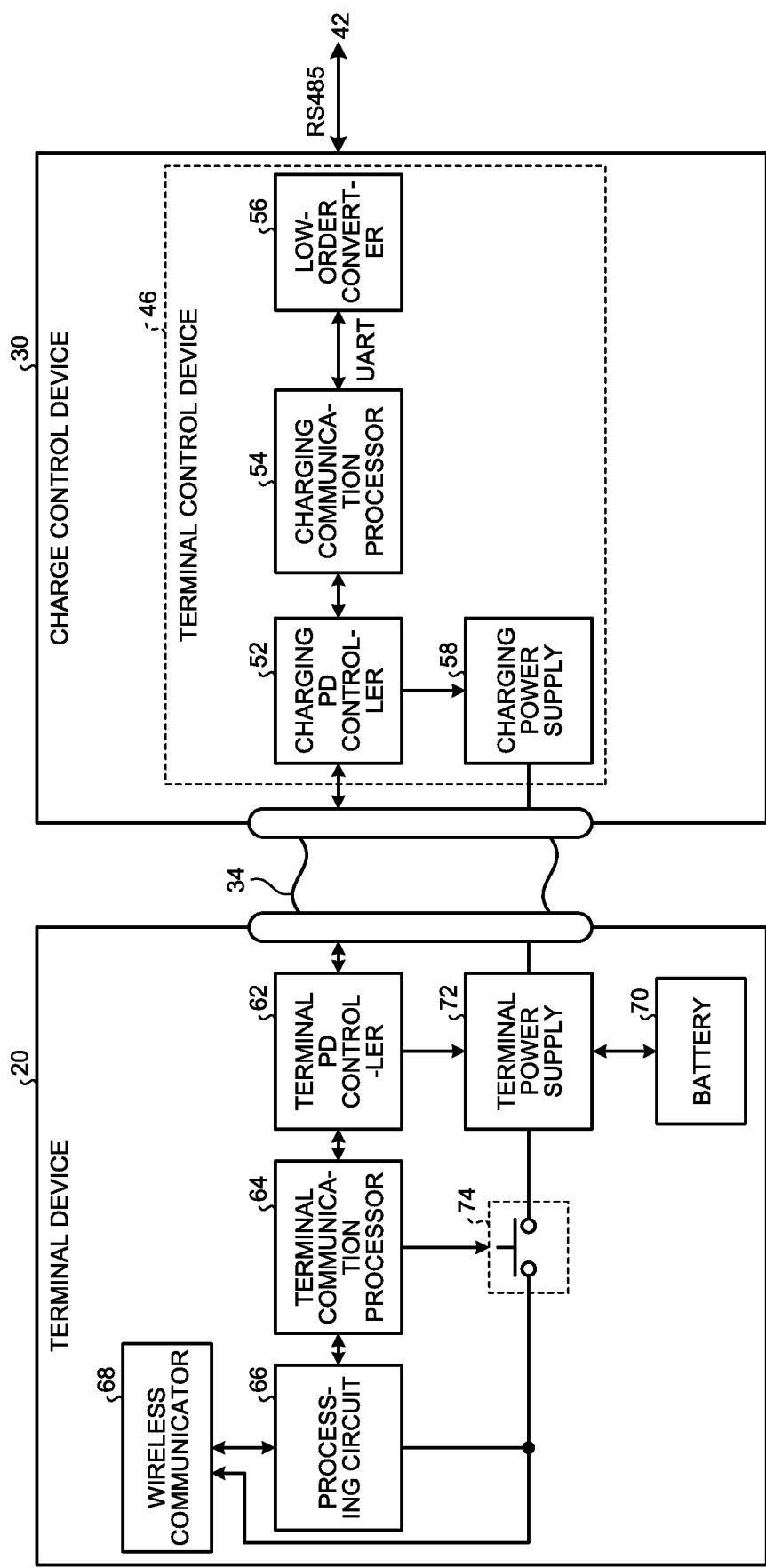
FIG. 11 is a diagram illustrating exemplary hardware configurations of the terminal device and of a terminal controller of the charge control device.

FIG. 11 is a diagram illustrating exemplary hardware configurations of the terminal device 20 and the terminal controller 46 of the charge control device 30.

The terminal controllers 46 of the charge control device 30 each include a charging power-delivery (PD) controller 52 (power supply controller), a charging communication processor 54, a low-order convertor 56, and a charging power supply 58.

The charging PD controller 52 can be connected to the terminal device 20 via the cable 34. The charging PD controller 52 supplies power and communicates information via the cable 34 in accordance with a standard defining specifications for power supply and communications of information via the cable 34.

In the present embodiment, the charging PD controller 52 supplies power to and communicate information with the terminal device 20 in compliance with the USB-C standard. In the present embodiment, the charging PD controller 52 transmits/receives a vendor defined messaging (VDM) signal to/from the terminal device 20 via a configuration channel (CC) signal line of the cable 34 conforming to the USB-C standard.

In connection with the terminal device 20 via the cable 34, the charging PD controller 52 determines a combination of supply voltage and supply current to the terminal device 20 by executing, together with the terminal device 20, a predefined sequence (power delivery sequence) by the standard. In the present embodiment, the charging PD controller 52 determines the combination of supply voltage and supply current to the terminal device 20 by executing predefined power delivery sequence by the USB-C standard. The charging PD controller 52 then instructs the charging power supply 58 to supply electric power with the determined voltage and current to the terminal device 20.

The charging communication processor 54 includes a central processing unit (CPU), a read only memory (ROM), and a random access memory (RAM), and controls the charging PD controller 52. The charging communication processor 54 loads a pre-stored computer program from the ROM into the RAM, for example, to control the charging PD controller 52 in accordance with the computer program. The charging communication processor 54 receives a command from the information processing device 32 via the low-order convertor 56 and the high-order convertor 42 by the computer program. The charging communication processor 54 also notifies the information processing device 32 of information through the low-order convertor 56 and the high-order convertor 42 by the computer program.

The low-order convertor 56 is connected to the high-order convertor 42 via a bus. The low-order convertor 56 converts a signal format between a signal line of a bus connected to the high-order convertor 42 and an input/output signal line of the charging communication processor 54.

In the present embodiment, the charging communication processor 54 inputs and outputs a signal in universal asynchronous receiver/transmitter (UART) format. Thus, in the present embodiment, the low-order convertor 56 converts between RS485 and UART.

While the charging communication processor 54 serve to input and output the RS485 signal, the terminal controller 46 may not include the low-order convertor 56. The low-order convertor 56 may convert the signal format into a format other than RS485.

The charging power supply 58 receives electric power from a power converter that converts AC voltage into direct current. The charging power supply 58 supplies electric power with a designated combination of voltage and current to the terminal device 20 via the cable 34 in accordance with an instruction from the charging PD controller 52.

The terminal device 20 includes a terminal PD controller 62 (power supply controller), a terminal communication processor 64, a processing circuit 66, a wireless communicator 68, a battery 70, a terminal power supply 72, and a power switch 74.

The terminal PD controller 62 can be connected to the charge control device 30 via the cable 34. The terminal PD controller 62 is supplied with power and communicates information via the cable 34 in accordance with a standard defining specifications for power supply and information and communications via the cable 34.

In the present embodiment, the terminal PD controller 62 is supplied with power from the charge control device 30 and communicates information therewith in compliance with the USB-C standard. In the present embodiment, the terminal PD controller 62 transmits/receives a VDM signal to/from the charge control device 30 via a CC signal line of the cable 34 conforming to the USB-C standard.

In connection with the charge control device 30 via the cable 34, the terminal PD controller 62 determines a combination of voltage and current to receive from the charge control device 30 by executing a predefined sequence (power delivery sequence) by the standard with the charge control device 30. In the present embodiment, the terminal PD controller 62 determines the combination of voltage and current to receive from the charge control device 30 by executing the power delivery sequence defined by the USB-C standard. The terminal PD controller 62 then instructs the terminal power supply 72 to receive electric power with the determined voltage and current from the charge control device 30.

The terminal communication processor 64 includes a CPU, a ROM, and a RAM, and controls the terminal PD controller 62. The terminal communication processor 64 loads a pre-stored computer program from the ROM into the RAM, for example, to control the terminal PD controller 62 in accordance with the computer program. For example, the terminal communication processor 64 gives, to the processing circuit 66, information on the charge control device 30 in connection via the cable 34. The terminal communication processor 64 receives the information from the charge control device 30 via the cable 34 to control the state of the power switch 74 on the basis of the information.

The processing circuit 66 includes a CPU, a ROM, and a RAM, and controls the terminal device 20 as a whole. The processing circuit 66 loads a pre-stored computer program from the ROM into the RAM, for example, and controls the terminal device 20 in accordance with the computer program. The processing circuit 66 gives a command to the terminal communication processor 64 or acquires information from the terminal communication processor 64 along with the execution of the computer program. The processing circuit 66 also controls the wireless communicator 68 along with the execution of the computer program.

The wireless communicator 68 performs wireless communication under the control of the processing circuit 66. In the present embodiment, the wireless communicator 68 performs wireless communication with the wireless communication device 24 and the internal wireless communication device 40. The wireless communicator 68 then relays information and communications between the processing circuit 66 and another device.

The battery 70 is a secondary battery. The battery 70 supplies electric power to the circuits of the terminal device 20.

The terminal power supply 72 receives electric power from the battery 70, and supplies the electric power to the circuits such as the processing circuit 66 and the wireless communicator 68 via the power switch 74. The terminal PD controller 62, the terminal communication processor 64, and the terminal power supply 72 are constantly supplied with electric power irrespective of a state of the power supply of the terminal device 20.

The terminal power supply 72 can also receive electric power from the charge control device 30 via the cable 34 in accordance with an instruction from the terminal PD controller 62. In this case, the terminal power supply 72 supplies the received electric power to the circuits such as the processing circuit 66 and the wireless communicator 68 via the power switch 74. The terminal power supply 72 supplies the received electric power to the battery 70 via the cable 34 to charge the battery 70.

In an ON state the power switch 74 supplies the electric power output from the terminal power supply 72 to the circuits such as the processing circuit 66 and the wireless communicator 68. In an OFF state, the power switch 74 disconnects power supply to the circuits such as the processing circuit 66 and the wireless communicator 68.

The power switch 74 is a push switch that alternately operates. For example, the state of the power switch 74 is switched in response to a user's press to a power button located on a housing. For example, being pressed in the OFF state, the power switch 74 is switched to the ON state. Being pressed in the ON state, the power switch 74 is switched to the OFF state.

The state of the power switch 74 is also switched in accordance with a signal from the internal circuitry of the terminal device 20. In the present embodiment, the terminal communication processor 64 can switch the state of the power switch 74.

Figure 12:
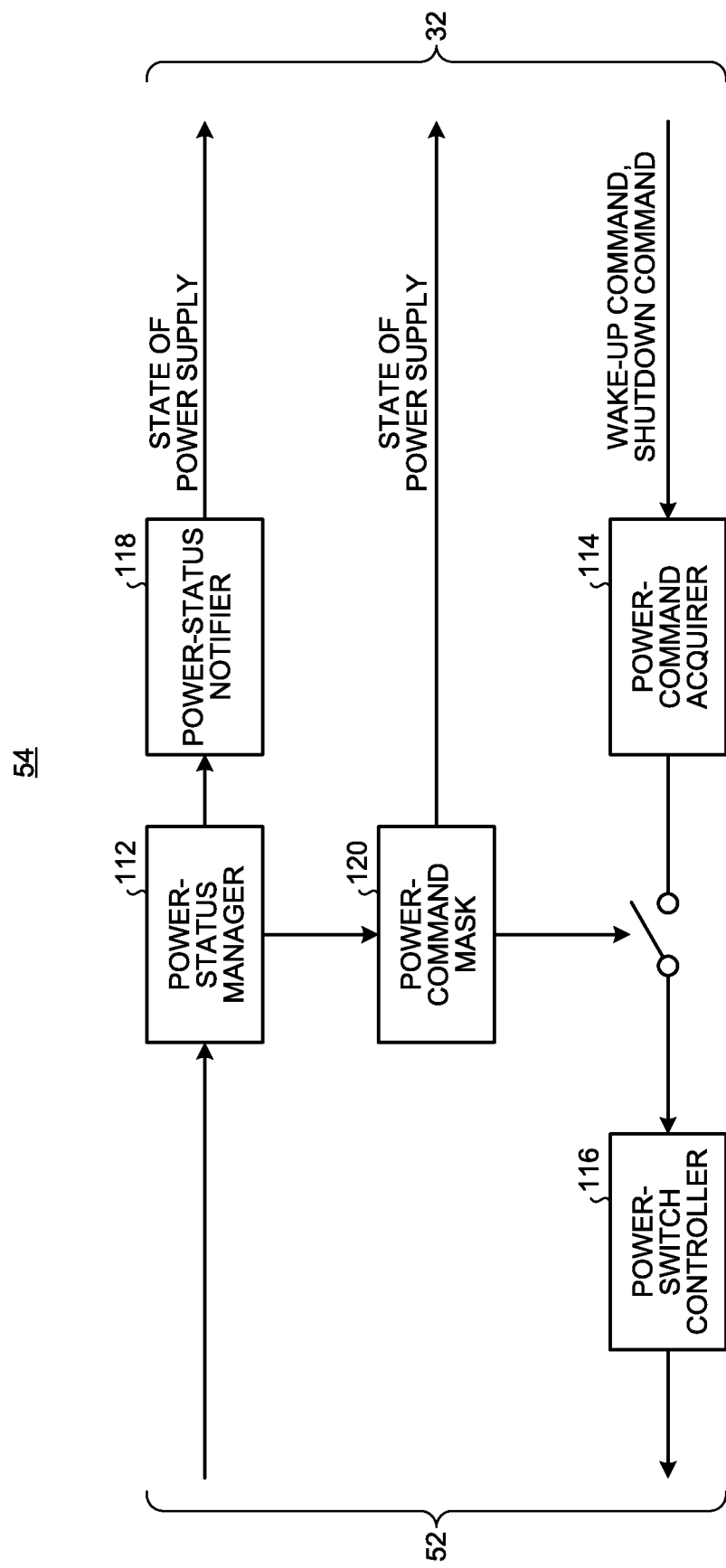
FIG. 12 is a diagram illustrating a functional configuration of a charging communication processor according to a first embodiment.

FIG. 12 is a diagram illustrating an exemplary functional configuration of the charging communication processor 54 according to the first embodiment.

The charging communication processor 54 of the first embodiment includes a power-status manager 112, a power-command acquirer 114, a power-switch controller 116, a power-status notifier 118, and a power-command mask 120. The charging communication processor 54 functions as the power-status manager 112, the power-command acquirer 114, the power-switch controller 116, the power-status notifier 118, and the power-command mask 120 by executing a given computer program.

The power-status manager 112 manages a running state or a non-running state of the terminal device 20 on the basis of the information received from the terminal device 20 via the cable 34. For example, the charging PD controller 52 receives a VDM signal from the terminal device 20 via the cable 34, and acquires the state of the power supply of the terminal device 20 from the received VDM signal. The power-status manager 112 acquires the state of the power supply of the terminal device 20 from the charging PD controller 52.

The running state is such that the power switch 74 of the terminal device 20 is in the ON state and that the processing circuit 66 (main storage and a CPU) regularly runs. The running state is also referred to as an S0 state.

The non-running state refers to a state other than the running state. The power-status manager 112 manages a shutdown state, a hibernation, and a sleep state as the non-running state in a distinctive manner.

The shutdown state is such that the power switch 74 of the terminal device 20 is in the OFF state and that the circuitry, except for constantly running circuitry, is supplied with no power. Examples of the constantly running circuitry include the terminal PD controller 62, the terminal communication processor 64, and the terminal power supply 72. The shutdown state is also referred to as a G3 state.

The hibernation is such that the power switch 74 of the terminal device 20 is in the OFF state and that the content of the main storage of the processing circuit 66 is copied to a non-volatile auxiliary storage. The non-volatile auxiliary storage is, for example, a hard disk or a flash memory. During hibernation, the circuitry, except for constantly running circuitry, is supplied with no power. The hibernation is also referred to as an S4 state.

The sleep state is such that the power switch 74 of the terminal device 20 is in the ON state and that the processing circuit 66 (the main storage and the CPU) and the circuitry, except for the constantly running circuitry, are supplied with no power. The sleep state is also referred to as an S3 state. Alternatively, the sleep state may be such that the main storage of the processing circuit 66 is supplied with power but the CPU is not in operation.

The power-command acquirer 114 receives a wake-up command for booting the terminal device 20 from the information processing device 32. The power-command acquirer 114 receives a shutdown command for shutting down the terminal device 20 from the information processing device 32.

In response to the power-command acquirer 114's receipt of the wake-up command or the shutdown command, the power-switch controller 116 instructs the charging PD controller 52 to output a switch-push signal to the terminal device 20. The switch-push signal serves as switching the state of the power switch 74 of the terminal device 20.

Receiving the instruction to output the switch-push signal to the terminal device 20, the charging PD controller 52 transmits the switch-push signal to the terminal device 20 via the cable 34. The terminal PD controller 62 of the terminal device 20 acquires the switch-push signal from the charging PD controller 52. After the terminal PD controller 62 acquires the switch-push signal, the terminal communication processor 64 of the terminal device 20 switches the state of the power switch 74. For example, upon acquiring the switch-push signal during the ON state of the power switch 74, the terminal communication processor 64 switches the power switch 74 to the OFF state. Upon acquiring the switch-push signal during the OFF state of the power switch 74, the terminal communication processor 64 switches the power switch 74 to the ON state.

In response to a change in the state of the power supply of the terminal device 20 managed by the power-status manager 112, the power-status notifier 118 notifies the information processing device 32 of the state of the power supply after change. Thus, the power-status notifier 118 can notify the information processing device 32 of the state of the power supply of the terminal device 20.

For example, if the power-command acquirer 114 receives the shutdown command while the terminal device 20 is running, the power-status notifier 118 returns notification information on the state of the power supply of the terminal device 20 to the information processing device 32 after the terminal device 20 transitions from the running state to the non-running state. Thereby, the power-status notifier 118 can notify the information processing device 32 of the event that that the state of the terminal device 20 is changed to the non-running state.

For example, if the power-command acquirer 114 receives the wake-up command during the non-running state of the terminal device 20, the power-status notifier 118 returns notification information on the state of the power supply of the terminal device 20 to the information processing device 32 after the terminal device 20 transitions from the non-running state to the running state. Thus, the power-status notifier 118 can notify the information processing device 32 of the event that the state of the terminal device 20 is changed to the running state.

In response to receipt of the wake-up command during the running state of the terminal device 20, the power-command mask 120 masks the wake-up command. Thereby, the power-command mask 120 can control the charging PD controller 52 not to output the switch-push signal to the terminal device 20. Thus, irrespective of transmission of the wake-up command from the information processing device 32 in the running state of the terminal device 20, the power-command mask 120 enables the terminal device 20 not to be placed in the non-running state but to be maintained in the running state.

In response to receipt of the wake-up command during the running state of the terminal device 20, the power-command mask 120 returns notification information on the state of the power supply (running state) of the terminal device 20 to the information processing device 32. Thereby, the power-command mask 120 can notify the information processing device 32 of the running state of the terminal device 20.

In response to receipt of the shutdown command during the non-running state of the terminal device 20, the power-command mask 120 masks the shutdown command. Thereby, the power-command mask 120 can control the charging PD controller 52 not to output the switch-push signal to the terminal device 20. Thus, irrespective of transmission of the shutdown command from the information processing device 32 in the non-running state of the terminal device 20, the power-command mask 120 enables the terminal device 20 not to be placed in the running state but to be maintained in the non-running state.

In response to receipt of the shutdown command during the non-running state of the terminal device 20, the power-command mask 120 returns the notification information on the state of the power supply of the terminal device 20 to the information processing device 32. Thereby, the power-command mask 120 can notify the information processing device 32 of the non-running state of the terminal device 20.

Figure 13:
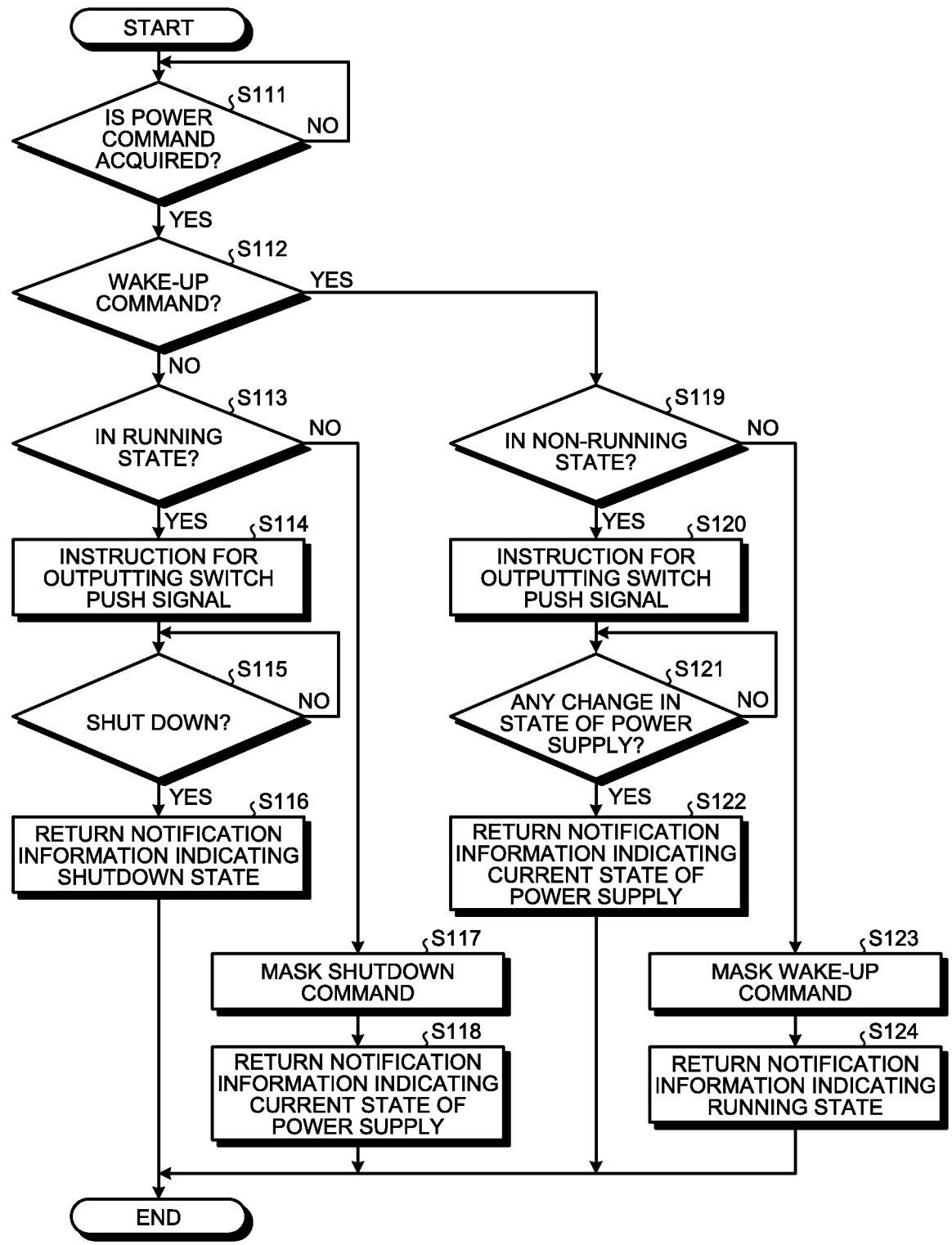
FIG. 13 is a flowchart illustrating processing of the charging communication processor according to the first embodiment.

FIG. 13 is a flowchart illustrating the processing of the charging communication processor 54 according to the first embodiment. In the first embodiment, the charging communication processor 54 performs processing, following the procedure illustrated in FIG. 13.

At S111, the charging communication processor 54 determines whether to have received a power command (wake-up command or shutdown command) from the information processing device 32. After determining no receipt of the power command (No at S111), the charging communication processor 54 stands by at S111. After determining receipt of the power command (Yes at S111), the charging communication processor 54 proceeds to S112.

At S112, the charging communication processor 54 determines whether the power command is the wake-up command. After determining the power command as not the wake-up command but the shutdown command (No at S112), the charging communication processor 54 proceeds to S113. After determining the power command as the wake-up command (Yes at S112), the charging communication processor 54 proceeds to S119.

At S113, the charging communication processor 54 determines whether the terminal device 20 is running. After determining that the terminal device 20 is running (Yes at S113), the charging communication processor 54 proceeds to S114. After determining that the terminal device 20 is not running (No at S113), it proceeds to S117.

At S114, the charging communication processor 54 instructs the charging PD controller 52 to output the switch-push signal. Thereby, the charging PD controller 52 can transmit the switch-push signal to the terminal device 20.

Subsequently, at S115, the charging communication processor 54 determines whether the terminal device 20 has been shut down. After determining that the terminal device 20 is not shut down (No at S115), the charging communication processor 54 stands by at S115. After determining that the terminal device 20 is shut down (Yes at S115), at S116 the charging communication processor 54 returns notification information indicating the shutdown of the terminal device 20 to the information processing device 32. After completing S116, the charging communication processor 54 ends this processing.

At S117, the charging communication processor 54 masks the received shutdown command. That is, the charging communication processor 54 does not give any instruction to the charging PD controller 52. Thus, the charging PD controller 52 transmits no switch-push signal. At S118, the charging communication processor 54 returns notification information indicating a current state of the power supply of the terminal device 20 to the information processing device 32. After completing S118, the charging communication processor 54 ends this processing.

At S119, the charging communication processor 54 determines whether the terminal device 20 is in the non-running state. If the terminal device 20 is in the non-running state (Yes at S119), the charging communication processor 54 proceeds to S120. If the terminal device 20 is not in the non-running state (No at S119), it proceeds to S123.

At S120, the charging communication processor 54 instructs the charging PD controller 52 to output the switch-push signal. Thereby, the charging PD controller 52 can transmit the switch-push signal to the terminal device 20.

At S121, the charging communication processor 54 determines whether the state of the power supply of the terminal device 20 has changed. After determining that the state of the power supply of the terminal device 20 has not changed (No at S121), the charging communication processor 54 stands by at S121. After determining that the state of the power supply of the terminal device 20 has changed (Yes at S121), at S122 the charging communication processor 54 returns the notification information indicating the current state of the power supply of the terminal device 20 to the information processing device 32. After completing S122, the charging communication processor 54 ends this processing.

At S123, the charging communication processor 54 masks the received wake-up command. Thereby, the charging communication processor 54 does not give any instruction to the charging PD controller 52. Thus, the charging PD controller 52 transmits no switch-push signal. Subsequently, at S124, the charging communication processor 54 returns the notification information indicating the running state of the terminal device 20 to the information processing device 32. After completing S124, the charging communication processor 54 ends this processing.

When receiving the shutdown command in the sleep state of the terminal device 20, the charging communication processor 54 may instruct the charging PD controller 52 to output the switch-push signal without masking the shutdown command. Thereby, in the case of receiving the shutdown command during the sleep state of the terminal device 20, the charging communication processor 54 can shut down the terminal device 20.

After receiving the shutdown command during the hibernation of the terminal device 20, the charging communication processor 54 instructs the charging PD controller 52 to output the switch-push signal to boot the terminal device 20. Thereafter, the charging communication processor 54 may instruct the charging PD controller 52 to output the switch-push signal again. Thereby, when receiving the shutdown command in the hibernation of the terminal device 20, the charging communication processor 54 can shut down the terminal device 20.

After receiving the wake-up command in the sleep state, the charging communication processor 54 may instruct the charging PD controller 52 to output a transition signal for placing the terminal device 20 in the running state from the sleep state, in place of the switch-push signal. Thereby, when receiving the wake-up command in the sleep state of the terminal device 20, the charging communication processor 54 can cause the terminal device 20 to be placed in the running state.

The charge control device 30 of the first embodiment as described above exhibits the following effects.

After receiving the wake-up command in the running state of the terminal device 20, the charge control device 30 of the first embodiment masks the wake-up command. Thereby, irrespective of transmission of the wake-up command from the information processing device 32 in the running state of the terminal device 20, the charge control device 30 of the first embodiment is able to not place the terminal device 20 in the non-running state but maintain the terminal device 20 in the running state. Thus, the charge control device 30 according to the first embodiment can appropriately switch the state of the power supply of the terminal device 20 under the control of the information processing device 32.

After receiving the shutdown command in the non-running state of the terminal device 20, the charge control device 30 of the first embodiment masks the shutdown command. Thereby, irrespective of transmission of the shutdown command from the information processing device 32 in the non-running state of the terminal device 20, the charge control device 30 of the first embodiment is able to not place the terminal device 20 in the running state but maintain the terminal device 20 in the non-running state.

After receiving the shutdown command in the running state of the terminal device 20, the charge control device 30 of the first embodiment returns the notification information indicating the state of the power supply of the terminal device 20 to the information processing device 32 after the terminal device 20 transitions from the running state to the non-running state. After receiving the wake-up command in the non-running state of the terminal device 20, the charge control device 30 of the first embodiment returns the notification information indicating the state of the power supply of the terminal device 20 to the information processing device 32 after the terminal device 20 transitions from the non-running state to the running state. Thereby, the charge control device 30 according to the first embodiment can notify the information processing device 32 of the state of the power supply of the terminal device 20.

After receiving the wake-up command in the running state of the terminal device 20, the charge control device 30 of the first embodiment returns the notification information indicating the state of the power supply of the terminal device 20 to the information processing device 32. After receiving the shutdown command in the non-running state of the terminal device 20, the charge control device 30 of the first embodiment returns the notification information indicating the state of the power supply of the terminal device 20 to the information processing device 32. Thereby, the charge control device 30 according to the first embodiment can notify the information processing device 32 of the state of the power supply of the terminal device 20.

The charge control device 30 according to the first embodiment manages the running state or the non-running state of the terminal device 20 on the basis of information received from the terminal device 20 via the cable 34. Thereby, the charge control device 30 according to the first embodiment can ensure masking of the shutdown command and the wake-up command.

The charge control device 30 of the first embodiment manages the shutdown, the hibernation, and the sleep as the non-running state in a distinctive manner. Thereby, the charge control device 30 according to the first embodiment can ensure masking of the shutdown command.

Second Embodiment

Next, the following describes an information processing system 10 according to a second embodiment. The information processing system 10 of the second embodiment includes the same hardware configuration as that of the first embodiment. The information processing system 10 of the second embodiment is different from that of the first embodiment in that the charging communication processor 54 of the charge control device 30 includes a different functional configuration.

Figure 14:
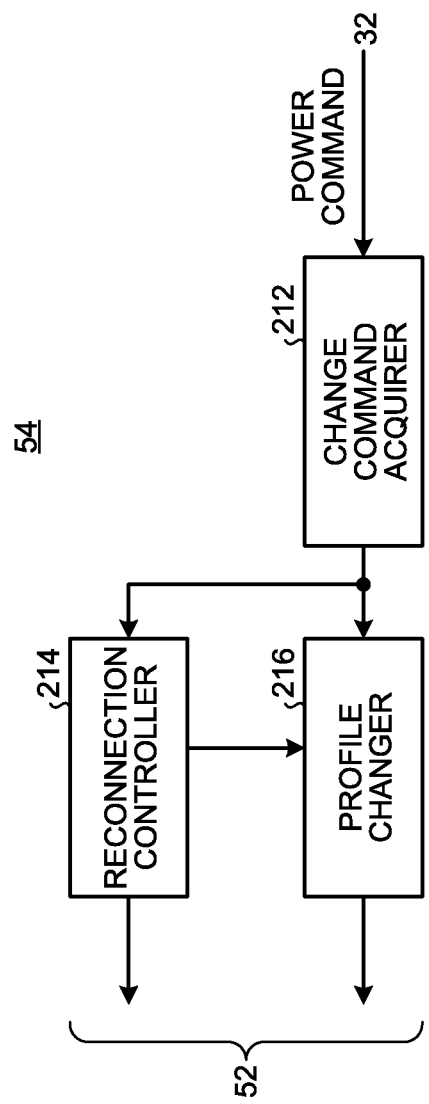
FIG. 14 is a diagram illustrating a functional configuration of a charging communication processor according to a second embodiment.

FIG. 14 is a diagram illustrating the functional configuration of the charging communication processor 54 according to the second embodiment, by way of example.

The charging communication processor 54 of the second embodiment includes a change-command acquirer 212, a reconnection controller 214, and a profile changer 216. The charging communication processor 54 functions as the change-command acquirer 212, the reconnection controller 214, and the profile changer 216 by executing a given computer program.

The change-command acquirer 212 receives, from the information processing device 32, a change command for instructing the acquirer 212 to change a supply voltage and a supply current to the terminal device 20. The change command includes information indicating a combination of the voltage and current after the change.

To change a combination of supply voltage and supply current to the terminal device 20, the reconnection controller 214 causes the charging PD controller 52 to disconnect power supply to the terminal device 20 and communication of information with the terminal device 20 via the cable 34. For example, after the change-command acquirer 212 receives the change command, the reconnection controller 214 causes the charging PD controller 52 to disconnect power supply to the terminal device 20 and communication of information with the terminal device 20 via the cable 34. The reconnection controller 214 may cause the charging PD controller 52 to disconnect power supply to and communication of information with the terminal device 20 via the cable 34 in response to occurrence of a predefined event, in place of receipt of the change command.

After disconnecting power supply to and communication of information with the terminal device 20 via the cable 34, the reconnection controller 214 causes the charging PD controller 52 to reconnect power supply to and communication of information with the terminal device 20 via the cable 34.

For example, the reconnection controller 214 gives a reset instruction to the charging PD controller 52 to disconnect power supply to and communication of information with the terminal device 20 via the cable 34. For example, the reconnection controller 214 gives a reset cancelling instruction to the charging PD controller 52 to reconnect power supply to and communication of information with the terminal device 20 via the cable 34. Thereby, the reconnection controller 214 can reliably cause the charging PD controller 52 to disconnect and reconnect power supply to and communication of information with the terminal device 20 via the cable 34.

To change the combination of supply voltage and supply current to the terminal device 20, the profile changer 216 sets a power profile to the charging PD controller 52. The power profile represents a combination of a voltage and a current that can be supplied to the terminal device 20. For example, in response to the change-command acquirer 212's receiving the change command, the profile changer 216 sets the power profile to the charging PD controller 52.

In this case, the charging PD controller 52 executes power delivery sequence in the following manner. First, the charging PD controller 52 transmits power-delivery object information to the terminal device 20. The power-delivery object information includes one or more preset power profiles. Subsequently, the charging PD controller 52 receives, from the terminal device 20, a response representing a power profile requested by the terminal device 20. The charging PD controller 52 starts supplying power to the terminal device 20 in accordance with the power profile indicated by the response. Through such a procedure, the charging PD controller 52 can determine a combination of a supply voltage and a supply current to the terminal device 20.

To execute such a power delivery sequence, the profile changer 216 sets, to the charging PD controller 52, the power profile indicating the voltage and the current that can be supplied to the terminal device 20, in a period between disconnection and reconnection of power supply to and communication of information with the terminal device 20 via the cable 34. Thereby, the profile changer 216 can ensure setting of the power profile to the charging PD controller 52 before the charging PD controller 52 transmits the power-delivery object information to the terminal device 20.

For example, the profile changer 216 sets, to the charging PD controller 52, the power profile for the power supply to the terminal device 20 after the reconnection controller 214 instructs the charging PD controller 52 to cancel the resetting and before the charging PD controller 52 transmits the power-delivery object information to the terminal device 20. Thereby, the profile changer 216 can ensure the setting of the power profile to the charging PD controller 52 when the reconnection controller 214 instructs the charging PD controller 52 to reset and cancel the resetting.

According to the standard defining specifications for power supply and communication of information via the cable 34, the charging PD controller 52 cannot change the power profile while maintaining the connection with the terminal device 20 via the cable 34. For example, according to the USB-C standard, the charging PD controller 52 cannot change the power profile while maintaining power supply and communication of information via the cable 34.

However, the charging communication processor 54 of the second embodiment disconnects power supply to and communication of information with the terminal device 20 via the cable 34. Thereafter, the charging communication processor 54 of the second embodiment reconnects power supply to and communication of information with the terminal device 20 via the cable 34. To reconnect the power supply and communication of information, the charging communication processor 54 of the second embodiment sets, to the charging PD controller 52, the power profile indicating the combination of voltage and current that can be supplied to the terminal device 20.

Thus, the charging communication processor 54 can optionally change the combination of supply voltage and supply current to the terminal device 20. For example, the charging communication processor 54 can set a supply voltage and a supply current to the terminal device 20, following an instruction from the information processing device 32.

Figure 15:
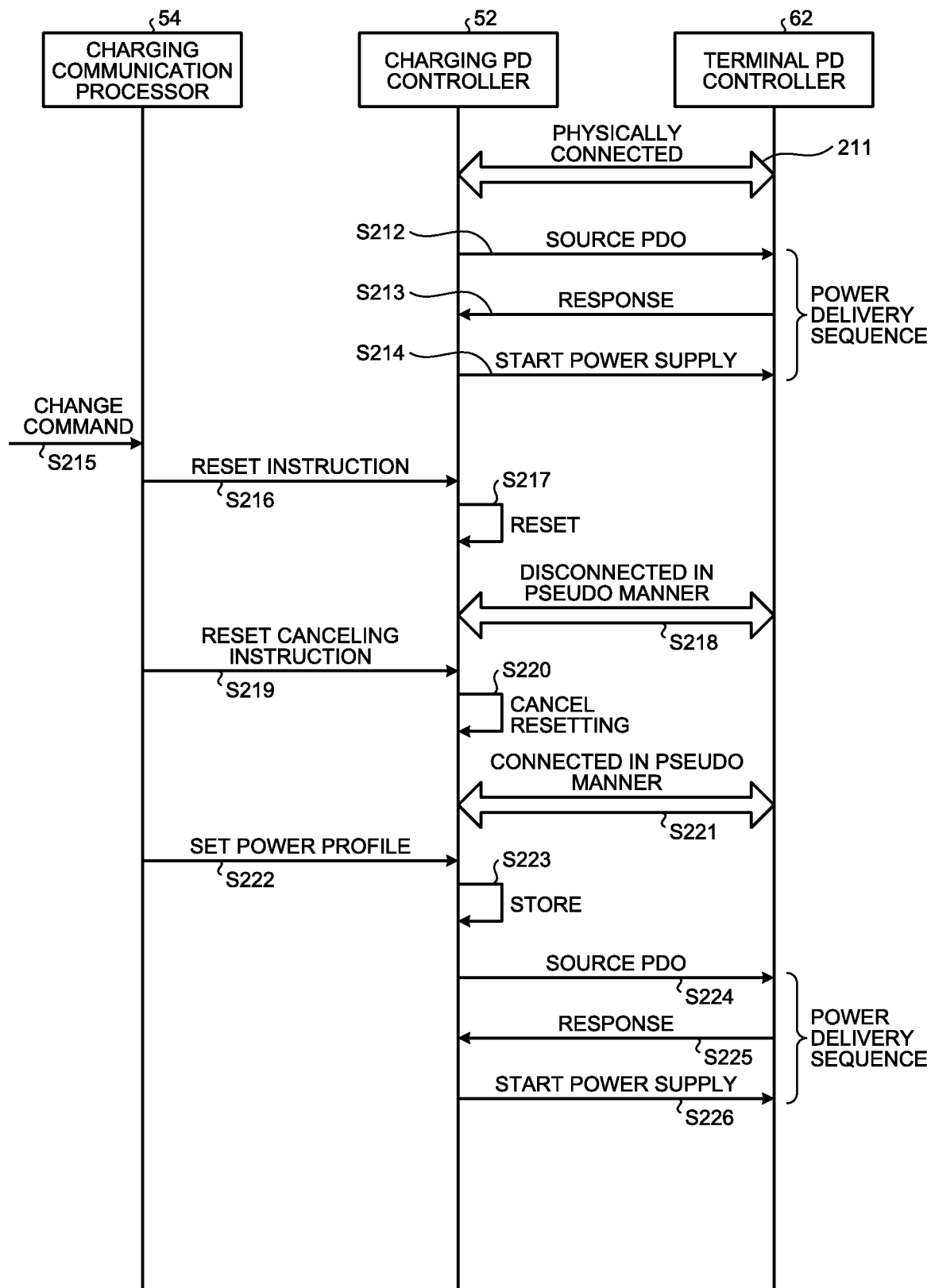
FIG. 15 is a sequence diagram illustrating processing of the charging communication processor according to the second embodiment.

FIG. 15 is a sequence diagram illustrating exemplary processing of the charging communication processor 54 according to the second embodiment. In the second embodiment, the charging communication processor 54, the charging PD controller 52, and the terminal PD controller 62 perform processing, following the procedure illustrated in FIG. 15.

At S211, the charging PD controller 52 and the terminal PD controller 62 are physically connected to each other via the cable 34.

At S212, the charging PD controller 52 transmits, to the terminal PD controller 62, power-delivery object information (source PDO) including one or more power profiles preset inside the controller 52.

The USB-C standard defines, as the power profiles, "5 V/900 mA", "5 V/3 A", "9 V/3 A", "12 V/3 A", "15 V/3 A", and "20 V/3 A". According to the USB-C standard, the charging PD controller 52 transmits the source PDO including one or more power profiles that the charging PD controller 52 can supply, among "5 V/900 mA", "5 V/3 A", "9 V/3 A", "12 V/3 A", "15 V/3 A", and "20 V/3 A".

The USB-C standard also defines a combination of minimum voltage and minimum current "5 V/900 mA" to be a default power profile. By the USB-C standard, devices conforming to the USB-C standard are to be able to supply and receive power at the default power profile.

Subsequently, at S213, the terminal PD controller 62 determines a profile to receive from among the one or more power profiles indicated by the source PDO. The terminal PD controller 62 then transmits a response representing the determined power profile to the charging PD controller 52.

At S214, the charging PD controller 52 starts supplying power to the terminal PD controller 62 at the power profile indicated by the response.

The operations from S212 to S214 are referred to as the power delivery sequence. According to the USB-C standard, the charging PD controller 52 and the terminal PD controller 62 cannot change the determined power profile while maintaining the connection via the cable 34 after completion of the power delivery sequence.

Subsequently, at S215 the charging communication processor 54 receives, from the information processing device 32, a change command for changing a supply voltage and a supply current to the terminal device 20. The change command includes a combination of supply voltage and supply current to the terminal device 20 requested by the information processing device 32.

At S216, the charging communication processor 54 gives a reset instruction to the charging PD controller 52. In response to the reset instruction, at S217 the charging PD controller 52 resets. By resetting, the charging PD controller 52 disconnects power supply and communication of information via the cable 34 while the cable 34 is inserted into a connector. As a result, at S218 the charging PD controller 52 and the terminal PD controller 62 are disconnected from each other in a pseudo manner. That is, the charging PD controller 52 and the terminal PD controller 62 appear to be in mutual connection via the cable 34, however, they are disconnected from each other in terms of an internal signal-line level.

Subsequently, at S219 the charging communication processor 54 gives a reset cancelling instruction to the charging PD controller 52. In response to the reset cancelling instruction, at S220 the charging PD controller 52 cancels the resetting. By resetting, the charging PD controller 52 connects power supply and communication of information via the cable 34, for example. As a result, at S221 the charging PD controller 52 and the terminal PD controller 62 are connected to each other in a pseudo manner. That is, the charging PD controller 52 and the terminal PD controller 62 not only appear to be mutually connected via the cable 34 and but also are mutually connected in terms of the internal signal-line level.

At S222, the charging communication processor 54 sets the power profile to the charging communication processor 54. The set power profile indicates the voltage and the current included in the change command. That is, the set power profile indicates the combination of supply voltage and supply current to the terminal device 20 requested by the information processing device 32 after the change. At S223, the charging communication processor 54 stores the set power profile therein. The set power profile is one or more power profiles as default power profile source PDO predefined by the USB-C standard, "5 V/900 mA" or "5 V/3 A", "9 V/3 A", "12 V/3 A", "15 V/3 A", and "20 v/3 A".

Subsequently, at S224 the charging PD controller 52 transmits, to the terminal PD controller 62, the power-delivery object information (source PDO) including the power profile stored at S223.

In this case, the charging PD controller 52 transmits the source PDO including the power profile stored at S223.

At S225, the terminal PD controller 62 determines one profile to receive from among the one or more power profiles indicated by the source PDO. The terminal PD controller 62 then transmits a response indicating the determined power profile to the charging PD controller 52.

At S226, the charging PD controller 52 starts supplying power to the terminal PD controller 62 at the power profile indicated by the response.

In the present embodiment, the charging communication processor 54 provides a reset instruction and a reset cancelling instruction, and sets the power profile upon receipt of the change command from the information processing device 32. Alternatively, the charging communication processor 54 may provide a reset instruction and a reset cancelling instruction, and set the power profile in response to occurrence of another event.

For example, the charging communication processor 54 may provide a reset instruction and a reset cancelling instruction, and set the power profile in response to completion of charging the terminal device 20. For another example, the charging communication processor 54 may provide a reset instruction and a reset cancelling instruction, and set the power profile at certain time intervals.

The charge control device 30 according to the second embodiment described above exhibits the following effects.

The charge control device 30 according to the second embodiment disconnects power supply to and communication of information with the terminal device 20 via the cable 34, and then reconnects power supply to and communication of information with the terminal device 20 via the cable 34. To reconnect power supply and communication of information, the charge control device 30 of the second embodiment sets, to the charging PD controller 52, the power profile indicating the combination of voltage and current that can be supplied to the terminal device 20. Thereby, the charge control device 30 of the second embodiment can switch the setting of power supply to the terminal device 20.

The charge control device 30 of the second embodiment and the terminal device 20 perform the power delivery sequence. Thereby, the charge control device 30 of the second embodiment can change the combination of supply voltage and supply current to the terminal device 20.

The charge control device 30 of the second embodiment sets the power profile to the charging PD controller 52 in a period between disconnection and reconnection of power supply to and communication of information with the terminal device 20 via the cable 34. Thereby, the charge control device 30 according to the second embodiment can ensure the setting of the power profile to the charging PD controller 52.

The charge control device 30 of the second embodiment gives a reset instruction to the charging PD controller 52 to disconnect power supply to and communication of information with the terminal device 20 via the cable 34. Further, the charge control device 30 of the second embodiment gives a reset cancelling instruction to the charging PD controller 52 to reconnect power supply to and communication of information with the terminal device 20 via the cable 34. Thereby, the charge control device 30 according to the second embodiment can ensure the disconnection and reconnection of power supply and communication of information.

The charge control device 30 of the second embodiment sets, to the charging PD controller 52, the power profile for the power supply to the terminal device 20 after giving a reset canceling instruction and before the charging PD controller 52 transmits the power-delivery object information to the terminal device 20. Thereby, the charge control device 30 according to the second embodiment can ensure the setting of the power profile to the charging PD controller 52 when the reconnection controller 214 instructs the charging PD controller 52 to reset and cancel the resetting.

Third Embodiment

Next, the following describes an information processing system 10 according to a third embodiment. The information processing system 10 of the third embodiment includes the same hardware configuration as those of the first and second embodiments. The information processing system 10 according to the third embodiment is different from that of the second embodiment in that the charging communication processor 54 of the charge control device 30 includes a different functional configuration.

Figure 16:
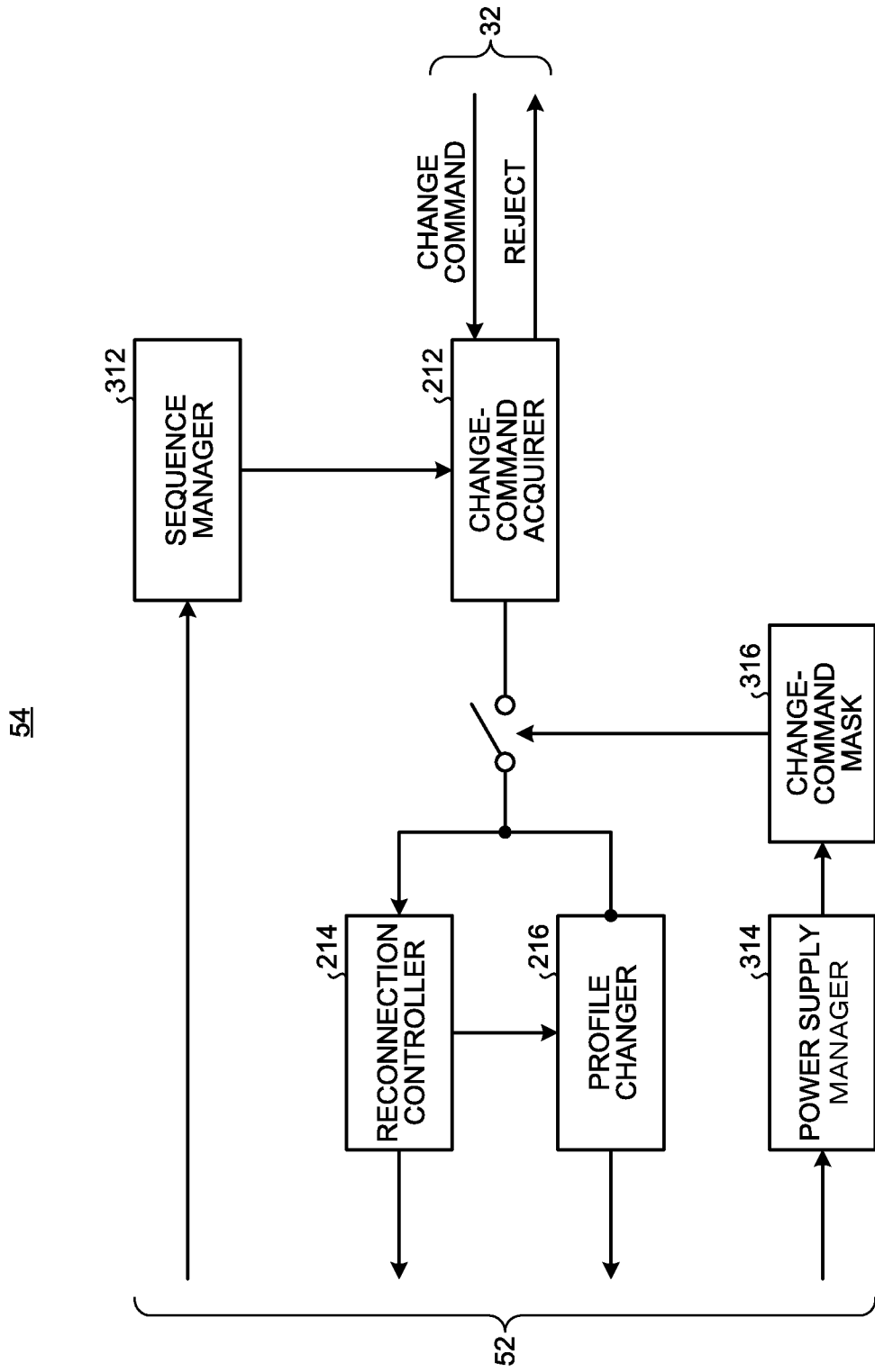
FIG. 16 is a diagram illustrating a functional configuration of a charging communication processor according to a third embodiment.

FIG. 16 is a diagram illustrating the functional configuration of the charging communication processor 54 according to the third embodiment, by way of example.

The charging communication processor 54 of the third embodiment includes the change-command acquirer 212, the reconnection controller 214, the profile changer 216, a sequence manager 312, a power supply manager 314, and a change-command mask 316. The charging communication processor 54 functions as the change-command acquirer 212, the reconnection controller 214, the profile changer 216, the sequence manager 312, the power supply manager 314, and the change command mask 316 by executing a given computer program.

The charging communication processor 54 of the third embodiment differs from the second embodiment in additionally including the sequence manager 312, the power supply manager 314, and the change command mask 316. The differences in the charging communication processor 54 from the second embodiment will be mainly described.

The sequence manager 312 manages execution or non-execution of the power delivery sequence for determining a supply voltage and a supply current to the terminal device 20. For example, the sequence manager 312 acquires a notification indicating execution or non-execution of the power delivery sequence from the charging PD controller 52, and stores the notification therein.

The change-command acquirer 212 receives, from the information processing device 32, a change command for changing a supply voltage and a supply current to the terminal device 20. Additionally, in the present embodiment, the change-command acquirer 212 rejects reception of the change command from the information processing device 32 during execution of the power delivery sequence. The change-command acquirer 212 determines whether the power delivery sequence is being executed, on the basis of the information stored in the sequence manager 312.

That is, the change-command acquirer 212 can prevent the charging PD controller 52 from performing unexpected operation, which would otherwise occur by resetting during execution of the power delivery sequence. The change-command acquirer 212 can also prevent unexpected error in the charging PD controller 52, which would otherwise occur by resetting during execution of the power delivery sequence. Thus, the charge control device 30 can allow the charging PD controller 52 to reliably execute the power delivery sequence.

After having rejected reception of the change command, the change-command acquirer 212 returns, to the information processing device 32, the notification information indicating rejection of reception of the change command. Thereby, the change-command acquirer 212 can notify the information processing device 32 of the rejection of reception of the change command.

The power supply manager 314 manages at least one of the power profiles used by the charging PD controller 52 which supplies the power to the terminal device 20. For example, after the charging PD controller 52 executes the power delivery sequence, the power supply manager 314 acquires a notification of the power profile based on which the charging PD controller 52 supplies power, and stores the notification therein. For example, according to the USB-C standard, the power supply manager 314 stores any of the power profiles "5 V/900 mA", "5 V/3 A", "9 V/3 A", "12 V/3 A", "15 V/3 A", and "20 V/3 A".

After the change-command acquirer 212 acquires the change command, the change command mask 316 determines whether the change command is an instruction for supplying power at a default power profile or a non-default power profile.

The default power profile represents a combination of voltage and current defined as default by the standard defining specifications for power supply and communication of information using the cable 34. The non-default power profile represents combinations of voltage and current other than default by the standard defining specifications for power supply and communication of information using the cable 34.

For example, the default power profile indicates a combination of the minimum voltage and the minimum current among voltages and currents defined to be able to supply by the standard. For example, under the USB-C standard, the default power profile is set to the combination "5 V/900 mA". Under the USB-C standard, non-default power profiles are set to combinations other than "5 V/900 mA", that is, "5 V/3 A", "9 V/3 A", "12 V/3 A", "15 V/3 A", and "20 V/3 A".

After the change-command acquirer 212 acquires the change command, the change command mask 316 determines whether the charging PD controller 52 is supplying power at the default power profile or the non-default power profile, on the basis of the information from the power supply manager 314.

Upon receiving the change command for power supply at the default power profile while the charging PD controller 52 is supplying power at the default power profile, the change command mask 316 masks the change command. Upon receiving the change command for power supply at the non-default power profile while the charging PD controller 52 is supplying power at the non-default power profile, the change command mask 316 masks the change command.

Since the change command is masked, the reconnection controller 214 receives no change command. That is, the reconnection controller 214 gives no instruction for resetting or cancellation of resetting to the charging PD controller 52. With the masked change command, the profile changer 216 refrains from receiving the change command. That is, the profile changer 216 does not set the power profile to the charging PD controller 52.

Thereby, upon receiving the change command for power supply at the default power profile while the charging PD controller 52 is supplying power supply at the default power profile, the change command mask 316 can prevent the charging PD controller 52 from varying the supply voltage and supply current to the terminal device 20. Upon receiving the change command for power supply at the non-default power profile during the power supply at the non-default power profile, the change command mask 316 can prevent the charging PD controller 52 from varying the supply voltage and supply current to the terminal device 20.

Thus, the change command mask 316 can eliminate unnecessary power delivery sequence such as changing the power profile to the same power profile.

Figure 17:
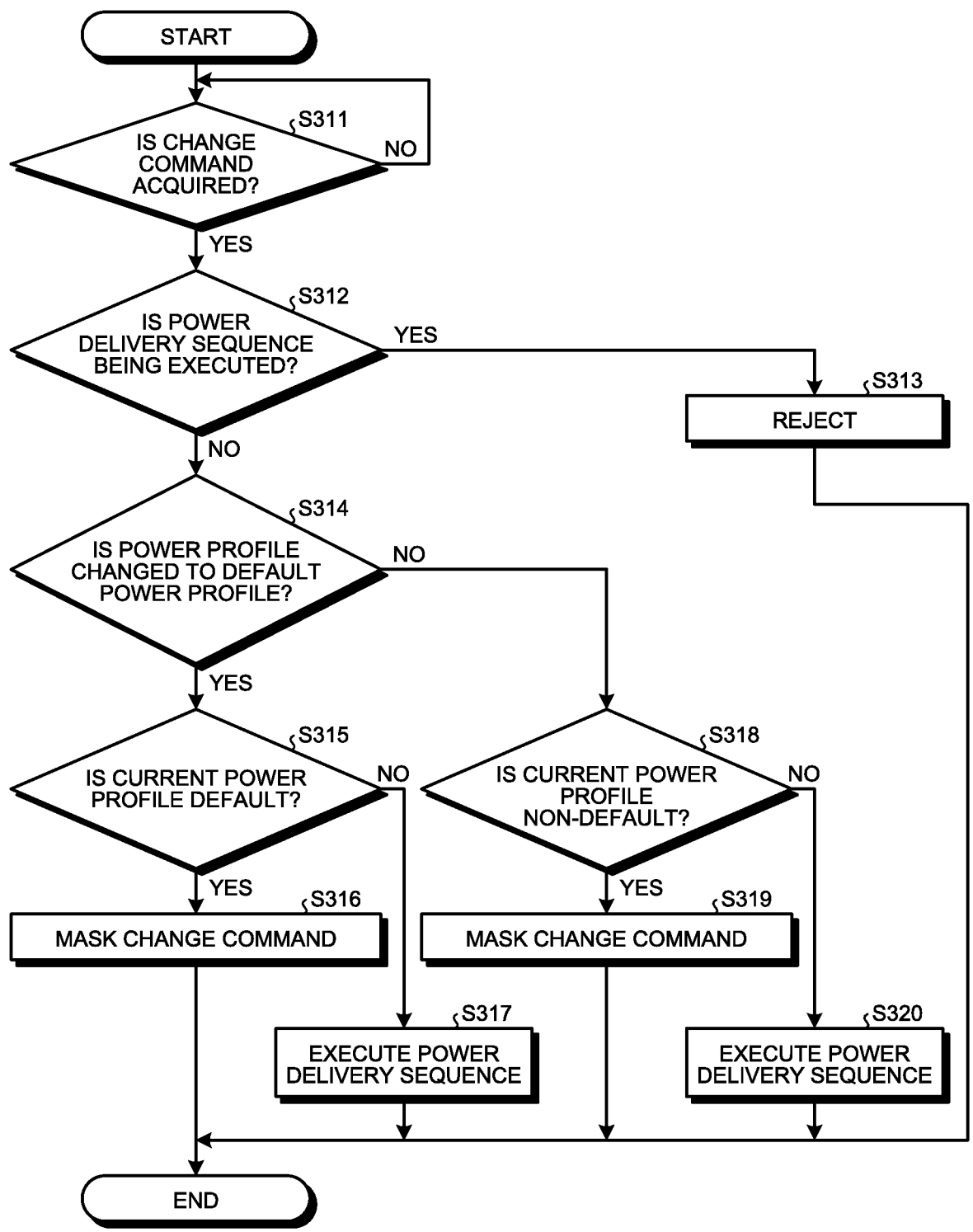
FIG. 17 is a flowchart illustrating processing of the charging communication processor according to the third embodiment.

FIG. 17 is a flowchart illustrating exemplary processing of the charging communication processor 54 according to the third embodiment. In the third embodiment, the charging communication processor 54 performs processing following the procedure illustrated in FIG. 17.

At S311, the charging communication processor 54 determines whether to have received the change command from the information processing device 32. With no receipt of the change command (No at S311), the charging communication processor 54 stands by at S311. With receipt of the change command (Yes at S311), the charging communication processor 54 proceeds to S312.

At S312, the charging communication processor 54 determines whether the power delivery sequence is being executed. During execution of the power delivery sequence (Yes at S312), the charging communication processor 54 proceeds to S313. During no execution of the power delivery sequence not being executed (No at S312), it proceeds to S314.

At S313, the charging communication processor 54 rejects reception of the change command. Additionally, at S313 the charging communication processor 54 may notify the information processing device 32 of the rejection of reception of the change command. After completing S313, the charging communication processor 54 ends this processing.

At S314, the charging communication processor 54 determines whether the received change command is an instruction for supplying power at the default power profile. After determining that the received change command is an instruction for supplying power at the default power profile (Yes at S314), the charging communication processor 54 proceeds to S315. After determining that the received change command is not an instruction for supplying power at the default power profile, that is, the received change command is an instruction for supplying power at the non-default power profile (No at S314), the charging communication processor 54 proceeds to S318.

At S315, the charging communication processor 54 determines whether the currently set power profile is default. If the currently set power profile is default (Yes at S315), the charging communication processor 54 masks the change command at S316. That is, the charging communication processor 54 performs no processing. Thus, the charging PD controller 52 executes no power delivery sequence. After completing S316, the charging communication processor 54 ends this processing.

If the currently set power profile is not default, that is, non-default (No at S315), the charging communication processor 54 proceeds to S317. At S317, the charging communication processor 54 causes the charging PD controller 52 to execute the power delivery sequence to supply power at the default power profile. After completing S317, the charging communication processor 54 ends this processing.

At S318, the charging communication processor 54 determines whether the currently set power profile is non-default. If the currently set power profile is non-default (Yes at S318), the charging communication processor 54 masks the change command at S319. That is, the charging communication processor 54 performs no processing. Thus, the charging PD controller 52 executes no power delivery sequence. After completing S319, the charging communication processor 54 ends this processing.

If the currently set power profile is not non-default, that is, default (No at S318), the charging communication processor 54 proceeds to S320. At S320, the charging communication processor 54 causes the charging PD controller 52 to execute the power delivery sequence to supply power at the non-default power profile indicated by the change command. After completing S320, the charging communication processor 54 ends this processing.

The charge control device 30 according to the third embodiment described above exhibits the following effects.

The charge control device 30 of the third embodiment rejects reception of the change command during execution of the power delivery sequence for determining a supply voltage and a supply current to the terminal device 20. Thereby, the charge control device 30 of the third embodiment can prevent the charging PD controller 52 from performing unexpected operation and prevent occurrence of unexpected error in the charging PD controller 52. Thus, the charge control device 30 according to the third embodiment can cause the charging PD controller 52 to reliably execute the power delivery sequence.

In the power delivery sequence, the charge control device 30 of the third embodiment transmits the power-delivery object information to the terminal device 20, receives a response indicating a requested power profile from the terminal device 20, and starts supplying power to the terminal device 20 at the power profile indicated by the response. Thereby, the charge control device 30 of the third embodiment can change the combination of supply voltage and supply current to the terminal device 20.

Upon rejecting reception of the change command, the charge control device 30 of the third embodiment returns, to the information processing device 32, the notification information indicating the rejection of reception of the change command. Thereby, the charge control device 30 can notify the information processing device 32 of the rejection of reception of the change command.

In response to the change command for supplying power at the default power profile during the power supply at the default power profile, the charge control device 30 of the third embodiment masks the change command. Thereby, the charge control device 30 of the third embodiment can eliminate unnecessary execution of power delivery sequence to change the power profile to the same power profile.

Upon receiving the change command for supplying power at the non-default power profile during the power supply at the non-default power profile, the charge control device 30 of the third embodiment masks the change command. Thereby, the charge control device 30 of the third embodiment can eliminate unnecessary execution of power delivery sequence to change the power profile to the same power profile.

In the third embodiment, the default power profile represents the combination of the minimum voltage and the minimum current among voltages and currents defined to be able to supply by the standard. Thereby, the charge control device 30 of the third embodiment can manage the combination of the minimum voltage and the minimum current as the default power profile.

Fourth Embodiment

Next, the following describes an information processing system 10 according to a fourth embodiment. The information processing system 10 of the fourth embodiment includes the same hardware configuration as those of the first to the third embodiments. The information processing system 10 of the fourth embodiment is different from those of the second and the third embodiments in that the charging communication processor 54 of the charge control device 30 includes a different functional configuration.

Figure 18:
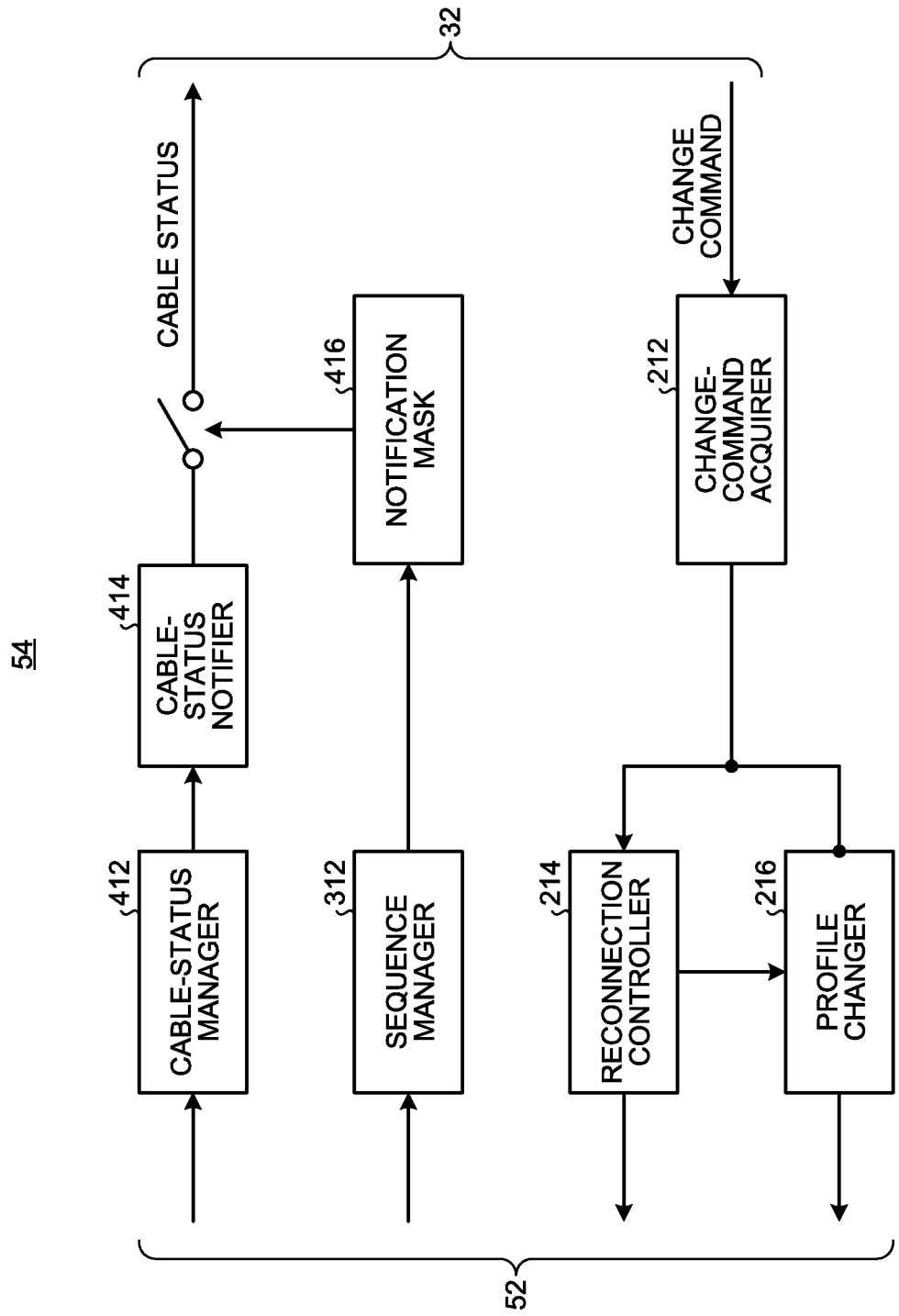
FIG. 18 is a diagram illustrating a functional configuration of a charging communication processor according to a fourth embodiment.

FIG. 18 is a diagram illustrating an exemplary functional configuration of the charging communication processor 54 according to the fourth embodiment.

The charging communication processor 54 of the fourth embodiment includes the change-command acquirer 212, the reconnection controller 214, the profile changer 216, the sequence manager 312, a cable-status manager 412, a cable-status notifier 414, and a notification mask 416. The charging communication processor 54 functions as the change-command acquirer 212, the reconnection controller 214, the profile changer 216, the sequence manager 312, the cable-status manager 412, the cable-status notifier 414, and the notification mask 416 by executing a given computer program.

The charging communication processor 54 of the fourth embodiment differs from the second embodiment in additionally including the sequence manager 312, the cable-status manager 412, the cable-status notifier 414, and the notification mask 416. Alternatively, the charging communication processor 54 of the fourth embodiment may further include the cable-status manager 412, the cable-status notifier 414, and the notification mask 416 in addition to the elements of the third embodiment. The following mainly describes differences in the charging communication processor 54 between the fourth embodiment and the second embodiment and the third embodiment.

The cable-status manager 412 manages a connection of the cable 34 between the charging PD controller 52 and the terminal device 20. That is, the cable-status manager 412 manages connection or disconnection of power supply and communication of information via the cable 34 between the charging PD controller 52 and the terminal device 20. For example, the cable-status manager 412 acquires, from the charging PD controller 52, a notification indicating connection or disconnection of power supply and communication of information via the cable 34, and stores the notification therein.

With a change in the connection state of the cable 34, the cable-status notifier 414 transmits notification information indicating the connection state of the cable 34 to the information processing device 32. That is, the cable-status notifier 414 transmits notification information indicating connection or disconnection of power supply and communication of information between the charging PD controller 52 and the terminal device 20 via the cable 34.

During execution of the power delivery sequence for changing the combination of a supply voltage and a supply current to the terminal device 20, the notification mask 416 masks the notification information on the connection state of the cable 34 and the information processing device 32. The notification mask 416 determines whether the power delivery sequence is being executed on the basis of the information managed by the sequence manager 312.

Since the notification information on the connection state of the cable 34 is masked, the charge control device 30 transmits no notification information to the information processing device 32. Thus, during execution of the power delivery sequence the notification mask 416 allows the charge control device 30 not to transmit the notification information on the connection state of the cable 34 to the information processing device 32.

The charging PD controller 52 of the present embodiment disconnects power supply and communication of information via the cable 34 during execution of the power delivery sequence, and then reconnects power supply and communication of information via the cable 34. That is, the cable-status notifier 414 outputs the notification information twice during execution of the power delivery sequence. However, the information processing device 32 performs no information processing using connection information and disconnection information of the cable 34 during execution of the power delivery sequence.

Thus, the notification mask 416 masks the notification information on the connection state during execution of the power delivery sequence. Thereby, the notification mask 416 can eliminate unnecessary communication, simplifying the processing.

After end of the power delivery sequence, typically, the connection state between the charging PD controller 52 and the terminal device 20 does not change. However, for some reason the connection state of the cable 34 between the charging PD controller 52 and the terminal device 20 may change.

In view of this, after the power delivery sequence, with a change in the connection state of the cable 34 from before start of the sequence, the cable-status notifier 414 transmits the notification information to the information processing device 32. Thereby, the cable-status notifier 414 can correctly notify the information processing device 32 of the state of the connection to the terminal device 20.

Figure 19:
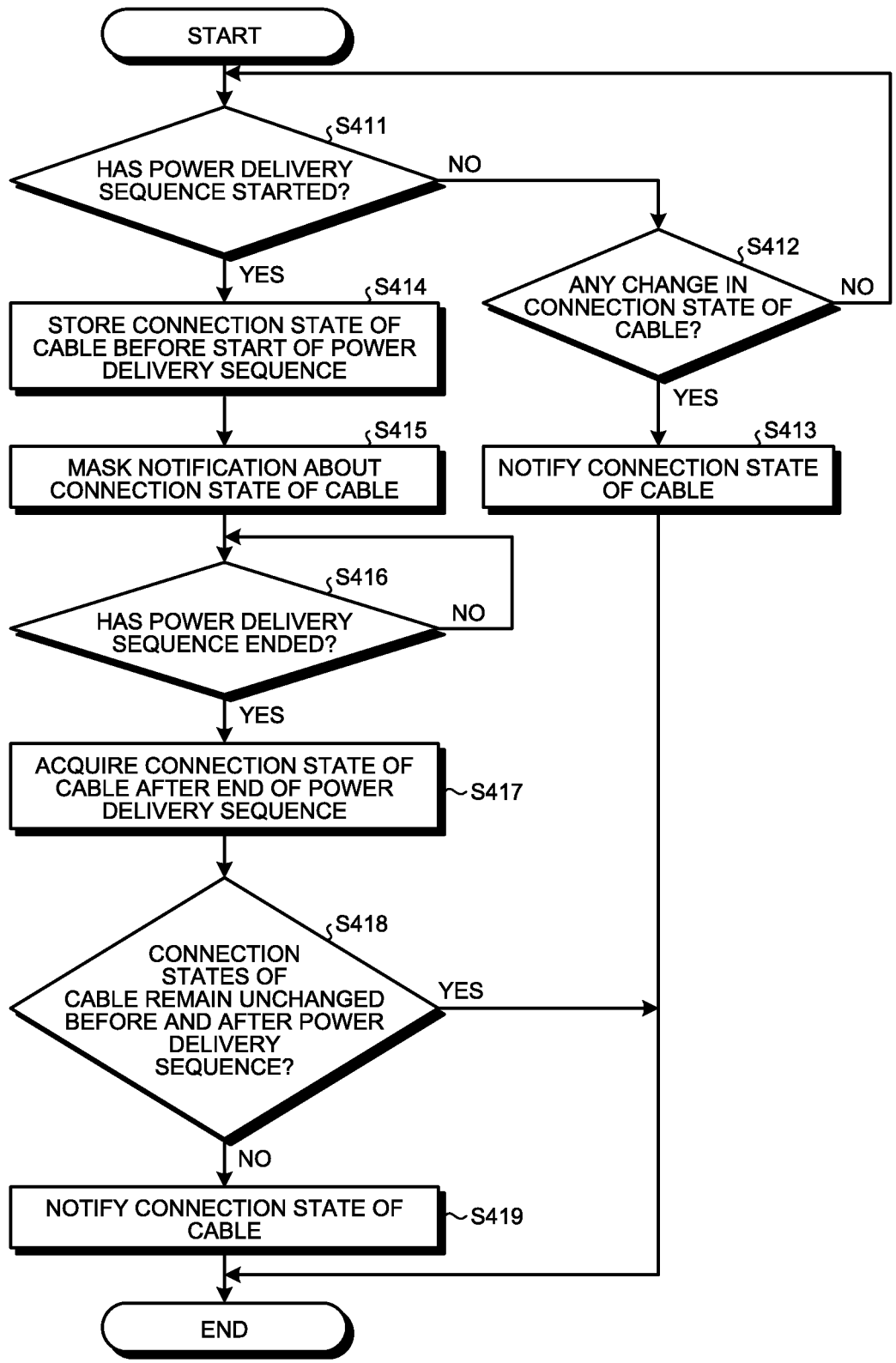
FIG. 19 is a flowchart illustrating processing of the charging communication processor according to the fourth embodiment.

FIG. 19 is a flowchart illustrating exemplary processing of the charging communication processor 54 according to the fourth embodiment. In the fourth embodiment, the charging communication processor 54 performs the processing, following the procedure illustrated in FIG. 19.

At S411, the charging communication processor 54 determines start or non-start of execution of the power delivery sequence. If the power delivery sequence has not started (No at S411), the charging communication processor 54 proceeds to S412. At S412, the charging communication processor 54 determines whether there is any change in the connection state of the cable 34. After determining no change in the connection state of the cable 34 (No at S412), the charging communication processor 54 returns to S411 and stands by until the power delivery sequence starts or the connection state of the cable 34 changes. After determining a change in the connection state of the cable 34 (Yes at S412), the charging communication processor 54 proceeds to S413.

At S413, the charging communication processor 54 transmits, to the information processing device 32, the notification information indicating a current connection state of the cable 34. After completing S413, the charging communication processor 54 ends this processing.

After start of the power delivery sequence (Yes at S411), the charging communication processor 54 proceeds to S414. At S414, the charging communication processor 54 acquires and stores the connection state of the cable 34 immediately before the execution of the power delivery sequence.

Subsequently, at S415 the charging communication processor 54 masks transmission of the notification information indicating the connection state. That is, at S415, the charging communication processor 54 performs no processing.

At S416, the charging communication processor 54 determines end or non-end of the execution of the power delivery sequence. After determining that the power delivery sequence has not ended (No at S416), the charging communication processor 54 stands by at S416. After determining that the power delivery sequence has ended (Yes at S416), the charging communication processor 54 proceeds to S417.

At S417, the charging communication processor 54 acquires the connection state of the cable 34 immediately after the end of the power delivery sequence. At S418, the charging communication processor 54 determines whether the connection state of the cable 34 remains unchanged from immediately before the start of the power delivery sequence to immediately after the end of the power delivery sequence. If the connected state of the cable 34 remains unchanged (Yes at S418), the charging communication processor 54 ends this processing.

If the connection state of the cable 34 has changed from immediately before the start of the power delivery sequence to immediately after the end of the power delivery sequence (Yes at S418), the charging communication processor 54 transmits the notification information indicating the current connection state of the cable 34 to the information processing device 32 at S419. After completing S419, the charging communication processor 54 ends this processing.

The charge control device 30 according to the fourth embodiment described above exhibits the following effects.

The charge control device 30 of the fourth embodiment masks the notification information on the connection state of the cable 34 to the information processing device 32 during execution of the power delivery sequence. Thereby, the charge control device 30 according to the fourth embodiment can correctly notify the connection state of the terminal device 20, eliminating complex processing.

After the end of the power delivery sequence, with a change in the connection state of the cable 34 from before the execution of the power delivery sequence, the charge control device 30 of the fourth embodiment transmits the notification information indicating the connection state of the cable 34 to the information processing device 32. Thereby, the charge control device 30 according to the fourth embodiment can correctly notify the information processing device 32 of the connection state of the terminal device 20.

The charge control device 30 of the fourth embodiment provide a reset instruction to the charging PD controller 52 to disconnect power supply to and communication of information with the terminal device 20 via the cable 34. The charge control device 30 of the fourth embodiment provides a reset cancelling instruction to the charging PD controller 52 to cancel the resetting and reconnect power supply to and communication of information with the terminal device 20 via the cable 34. Thereby, the charge control device 30 according to the fourth embodiment can reliably disconnect and reconnect power supply and communication of information.

Fifth Embodiment

Next, the following describes an information processing system 10 according to a fifth embodiment. The information processing system 10 of the fifth embodiment includes the same hardware configuration as those of the first to the fourth embodiments.

Figure 20:
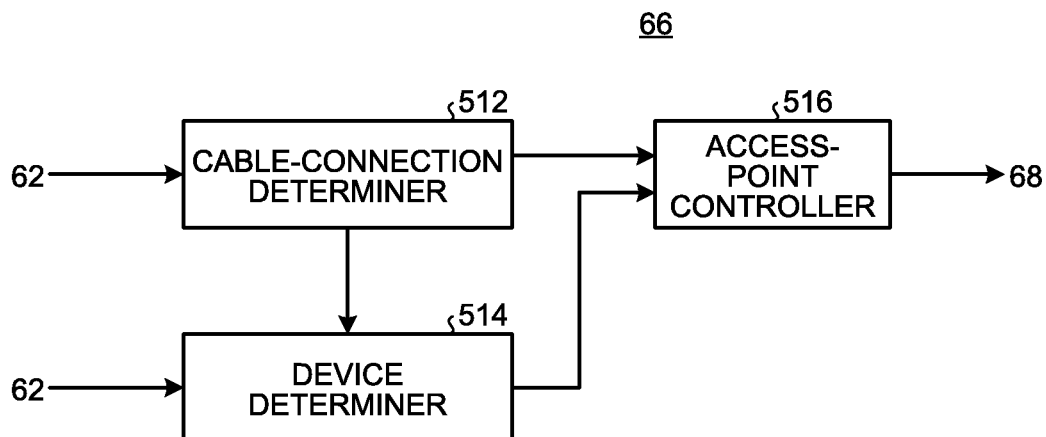
FIG. 20 is a diagram illustrating a functional configuration of a processing circuit according to a fifth embodiment.

FIG. 20 is a diagram illustrating a functional configuration of the processing circuit 66 of the terminal device 20 according to the fifth embodiment.

The processing circuit 66 of the fifth embodiment includes a cable-connection determiner 512, a device determiner 514, and an access-point controller 516. The processing circuit 66 functions as the cable-connection determiner 512, the device determiner 514, and the access-point controller 516 by executing a given computer program.

The cable-connection determiner 512 manages the connection state of the cable 34 between the terminal PD controller 62 and the charge control device 30. That is, the cable-connection determiner 512 determines whether the terminal PD controller 62 is connected to the charge control device 30 via the cable 34. For example, the cable-connection determiner 512 acquires, from the terminal PD controller 62, a notification indicating connection or disconnection of power supply and communication of information via the cable 34, and stores the notification therein.

If the terminal PD controller 62 in no connection to any device becomes connected to a certain device via the cable 34, the cable-connection determiner 512 notifies the device determiner 514 of the connection of the terminal PD controller 62 to the device. If the terminal PD controller 62 connected to a certain device becomes disconnected therefrom via the cable 34, the cable-connection determiner 512 notifies the access-point controller 516 of the disconnection of the terminal PD controller 62 from the device.

The device determiner 514 determines whether the device in connection via the cable 34 is the charge control device 30 as predefined. For example, after the terminal device 20 becomes connected to a device via the cable 34, the device determiner 514 determines whether the device is the charge control device 30 on the basis of the information received via the cable 34. Thereby, the terminal device 20 can correctly determine whether the connected device via the cable 34 is the charge control device 30.

When the connected device via the cable 34 is the charge control device 30, the device determiner 514 transmits, to the access-point controller 516, information that the connected device via the cable 34 is the charge control device 30.

The access-point controller 516 controls the wireless communicator 68 of the terminal device 20. The wireless communicator 68 is wirelessly connected to the access point to communicate information via a network.

After the device determiner 514 determines that the terminal device 20 is connected to the charge control device 30 via the cable 34, the access-point controller 516 causes the wireless communicator 68 to wirelessly connect to the first access point associated with the charge control device 30.

In the present embodiment, the internal wireless communication device 40 of the information processing device 32 provides the first access point. Thus, after the terminal device 20 becomes connected to the charge control device 30 via the cable 34, the access-point controller 516 causes the wireless communicator 68 to wirelessly connect to the internal wireless communication device 40 of the information processing device 32.

Thereby, while connected to the charge control device 30 via the cable 34 inside the charging cabinet 26, the terminal device 20 can be connected to the information processing device 32 in a wireless manner. Thus, while being stored in the charging cabinet 26, the terminal device 20 can transmit or receive data via the information processing device 32, and can be subjected to remote control via the information processing device 32. Thus, the terminal device 20, while connected to the charge control device 30 via the cable 34, can be connected to an appropriate access point in a wireless manner.

When the terminal device 20 is disconnected from the charge control device 30 via the cable 34, the access-point controller 516 causes the wireless communicator 68 to wirelessly connect to a predefined second access point different from the first access point. The access-point controller 516 determines disconnection of the terminal device 20 from the charge control device 30 via the cable 34 on the basis of a result of the determination by the cable-connection determiner 512 and a result of the determination by the device determiner 514.

In the present embodiment, the wireless communication device 24 located outside the charging cabinet 26 provides the second access point. Thus, when the terminal device 20 is disconnected from the charge control device 30, the access-point controller 516 causes the wireless communicator 68 to connect to the wireless communication device 24 in a wireless manner.

Thereby, being extracted from the charging cabinet 26, the terminal device 20 can be wirelessly connected to the wireless communication device 24. That is, the terminal device 20 can be firmly connected to the access point in a wireless manner at higher radio field intensity. In this manner, the terminal device 20, when disconnected from the charge control device 30, can be wirelessly connected to an appropriate access point.

When disconnected from the charge control device 30 via the cable 34, the access-point controller 516 may invalidate setting information for wireless connection to the first access point set to the wireless communicator 68. Upon invalidation of the setting information, the wireless communicator 68 searches the surroundings for an appropriate access point, and wirelessly connect to the access point. Thus, the terminal device 20, when disconnected from the charge control device 30, can invalidate a wireless connection to an inappropriate access point, and can wirelessly connect to an appropriate, new access point.

Figure 21:
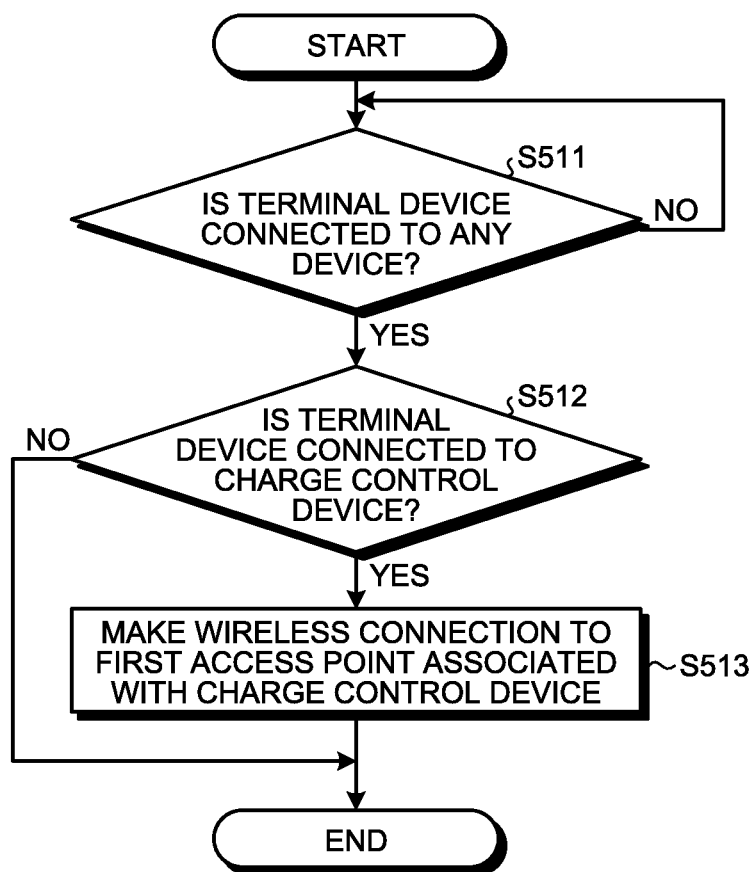
FIG. 21 is a flowchart illustrating first processing of the processing circuit according to the fifth embodiment.

FIG. 21 is a flowchart illustrating first processing of the processing circuit 66 according to the fifth embodiment. In the fifth embodiment, the processing circuit 66 performs processing, following the procedure illustrated in FIG. 21.

At S511, the processing circuit 66 determines whether the terminal device 20 is connected to any device via the cable 34. If the terminal device 20 is not connected to any device (No at S511), the processing circuit 66 stands by at S511. If the terminal device 20 is connected to a device (Yes at S511), the processing circuit 66 proceeds to S512.

At S512, the processing circuit 66 determines whether the terminal device 20 is connected to the charge control device 30 via the cable 34. If the terminal device 20 is not connected to the charge control device 30 (No at S512), the processing circuit 66 ends this processing. If the terminal device 20 is connected to the charge control device 30 (Yes at S512), the processing circuit 66 proceeds to S513.

At S513, the processing circuit 66 instructs the wireless communicator 68 to wirelessly connect to the first access point associated with the charge control device 30. In the present embodiment, the processing circuit 66 instructs the wireless communicator 68 to wirelessly connect to the internal wireless communication device 40 of the information processing device 32. After completing S513, the processing circuit 66 ends this processing.

Figure 22:
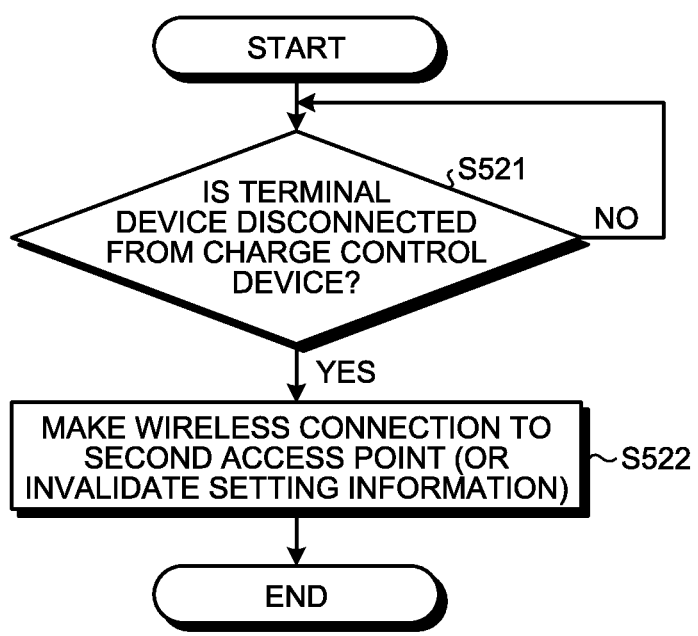
FIG. 22 is a flowchart illustrating second processing of the processing circuit according to the fifth embodiment.

FIG. 22 is a flowchart illustrating second processing of the processing circuit 66 according to the fifth embodiment. In the fifth embodiment, the processing circuit 66 performs processing while the terminal device 20 is connected to the charge control device 30 via the cable 34, following the procedure illustrated in FIG. 22.

At S521, the processing circuit 66 determines whether the terminal device 20 is disconnected from the charge control device 30 via the cable 34. If the terminal device 20 is not disconnected (No at S521), the processing circuit 66 stands by at S521. If the terminal device 20 is disconnected (Yes at S521), the processing circuit 66 proceeds to S522.

At S522, the processing circuit 66 instructs the wireless communicator 68 to wirelessly connect to the second access point different from the first access point. In the embodiment, the processing circuit 66 instructs the wireless communicator 68 to wirelessly connect to the wireless communication device 24 located outside the charging cabinet 26. After completing S522, the processing circuit 66 ends this processing.

At S522, the processing circuit 66 may invalidate the setting information for a wireless connection to the first access point set to the wireless communicator 68, instead of wirelessly connecting the wireless communicator 68 to the second access point. Upon invalidation of the setting information, the wireless communicator 68 searches the surroundings for an appropriate access point and wirelessly connect to the access point. In this manner, the terminal device 20 can be wirelessly connected to the access point at higher radio field intensity outside the charging cabinet 26.

The terminal device 20 according to the fifth embodiment described above exhibits the following effects.

Being connected to the charge control device 30 via the cable 34, the terminal device 20 of the fifth embodiment causes the wireless communicator 68 to wirelessly connect to the first access point associated with the charge control device 30. That is, while being in connection with the charge control device 30 via the cable 34, the terminal device 20 of the fifth embodiment can be connected to an appropriate access point in a wireless manner.

When disconnected from the charge control device 30 via the cable 34, the terminal device 20 of the fifth embodiment causes the wireless communicator 68 to connect to the second access point in a wireless manner. Thereby, the terminal device 20 of the fifth embodiment can be connected to an appropriate access point in a wireless manner, when disconnected from the charge control device 30 via the cable 34.

When disconnected from the charge control device 30 via the cable 34, the terminal device 20 of the fifth embodiment invalidates the setting information for the wireless communicator 68 to wirelessly connect to the first access point set to the wireless communicator 68. Thereby, the terminal device 20 of the fifth embodiment can invalidate a wireless connection to an inappropriate access point, and can be connected to an appropriate, new access point.

When connected to a device via the cable 34, the terminal device 20 of the fifth embodiment determines whether the device is the charge control device 30 on the basis of the information received via the cable 34. Thereby, the terminal device 20 of the fifth embodiment can correctly determine whether the connected device via the cable 34 is the charge control device 30.

Computer Program

The computer program executed by the charge control device 30 or the terminal device 20 in any of the first to fifth embodiments is recorded and provided in an installable or executable file format on a computer-readable recording medium such as a compact disc read only memory (CD-ROM), a flexible disk (FD), a compact disc recordable (CD-R), and a digital versatile disc (DVD).

The computer program executed by the charge control device 30 or the terminal device 20 in any of the first to fifth embodiments may be stored and provided in a computer connected to a network such as the Internet by being downloaded via the network. The computer program executed by the charge control device 30 or the terminal device 20 in any of the first to fifth embodiments may be provided or distributed via a network such as the Internet. The computer program executed by the charge control device 30 or the terminal device 20 in any of the first to fifth embodiments may be incorporated in advance in a ROM, for example.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The first embodiment can include the following examples.

First Example of First Embodiment

A control device controls power supply to a terminal device. The control device includes a power supply controller that is connectable to the terminal device via a cable, and supplies power to the terminal device and communicates information with the terminal device via the cable; a power-command acquirer that receives a wake-up command from an information processing device, the wake-up command serving to boot the terminal device; a power-switch controller that instructs the power supply controller to output a switch-push signal to the terminal device, in response to receipt of the wake-up command, the switch-push signal serving to switch a state of a power switch of the terminal device; and a power-command mask that masks the wake-up command, in response to receipt of the wake-up command during a running state of the terminal device.

Second Example of First Embodiment

According to the control device in the first example of the first embodiment, the power-command acquirer receives a shutdown command for shutting down the terminal device. The power-switch controller instructs the power supply controller to output the switch-push signal to the terminal device, in response to receipt of the wake-up command or the shutdown command. The power-command mask masks the shutdown command, in response to receipt of the shutdown command during a non-running state of the terminal device.

Third Example of First Embodiment

According to the second example of the first embodiment, the control device further includes a power-status notifier. In response to receipt of the shutdown command during the running state of the terminal device, the power-status notifier returns notification information to the information processing device after the terminal device transitions from the running state to the non-running state. The notification information represents a state of the power supply of the terminal device. In response to receipt of the wake-up command during the non-running state of the terminal device, the power-status notifier returns the notification information to the information processing device after the terminal device transitions from the non-running state to the running state.

Fourth Example of First Embodiment

According to the control device in the third example of the first embodiment, the power-command mask returns the notification information to the information processing device, in response to receipt of the wake-up command during the running state of the terminal device. The power-command mask returns the notification information to the information processing device, in response to receipt of the shutdown command during the non-running state of the terminal device.

Fifth Example of First Embodiment

The control device according to one of the second to the fourth examples of the first embodiment further includes a power-status manager that manages the running state or the non-running state of the power supply of the terminal device on the basis of information received from the terminal device via the cable.

Sixth Example of First Embodiment

According to the control device in the fifth example of the first embodiment, the power-status manager manages a shutdown state, a hibernation, and a sleep state as the non-running state in a distinctive manner.

Seventh Example of First Embodiment

An information processing system includes a terminal device; and a control device that controls power supply to the terminal device. The control device includes a power supply controller that is connectable to the terminal device via a cable, and supplies power to the terminal device and communicates information with the terminal device via the cable; a power-command acquirer that receives a wake-up command from an information processing device, the wake-up command serving to boot the terminal device; a power-switch controller that instructs the power supply controller to output a switch-push signal to the terminal device, in response to receipt of the wake-up command, the switch-push signal serving to switch a state of a power switch of the terminal device; and a power-command mask that masks the wake-up command, in response to receipt of the wake-up command during a running state of the terminal device.

Eighth Example of First Embodiment

A computer program product includes programmed instructions embodied in and stored on a non-transitory computer readable medium. The instructions are to be executed by a processor of a control device that controls power supply to a terminal device, and includes a power supply controller that is connectable to the terminal device via a cable, and supplies power to the terminal device and communicates information with the terminal device via the cable. The instructions, when executed by the processor, cause the processor to function as a power-command acquirer that receives a wake-up command from an information processing device, the wake-up command serving to boot the terminal device; a power-switch controller that instructs the power supply controller to output a switch-push signal to the terminal device, in response to receipt of the wake-up command, the switch-push signal serving to switch a state of a power switch of the terminal device; and a power-command mask that masks the wake-up command, in response to receipt of the wake-up command during a running state of the terminal device.

The second embodiment can include the following examples.

First Example of Second Embodiment

A control device controls power supply to a terminal device. The control device includes a power supply controller that is connectable to the terminal device via a cable, supplies power to the terminal device and communicates information with the terminal device via the cable, and determines a combination of a supply voltage and a supply current to the terminal device through communication with the terminal device via the cable; a reconnection controller that causes the power supply controller to disconnect power supply to and communication of information with the terminal device via the cable, and then reconnect power supply to and communication of information with the terminal device via the cable, in the case of changing the combination of the supply voltage and the supply current to the terminal device; and a profile changer that sets a power profile to the power supply controller in the case of changing the combination of the supply voltage and the supply current to the terminal device, the power profile representing the combination of a voltage and a current that are able to be supplied to the terminal device.

Second Example of Second Embodiment

According to the control device in the first example of the second embodiment, the power supply controller transmits, to the terminal device, power-delivery object information including one or more preset power profiles; receives, from the terminal device, a response indicating the power profile requested by the terminal device, and starts supplying power to the terminal device according to the power profile indicated by the response.

Third Example of Second Embodiment

According to the control device in the second example of the second embodiment, after disconnection of power supply and communication of information with the terminal device via the cable, the profile changer sets, to the power supply controller, the power profile indicating a voltage and a current that are able to be supplied to the terminal device after the change, before reconnecting power supply and communication of information with the terminal device via the cable.

Fourth Example of Second Embodiment

According to the control device in the second and the third examples of the second embodiment, the reconnection controller gives a reset instruction to the power supply controller to disconnect power supply to and communication of information with the terminal device via the cable, and gives a reset cancelling instruction to the power supply controller to reconnect power supply to and communication of information with the terminal device via the cable.

Fifth Example of Second Embodiment

According to the control device in the fourth example of the second embodiment, after the reconnection controller gives the reset canceling instruction, the profile changer sets, to the power supply controller, the power profile requesting a power supply to the terminal device before the power supply controller transmits the power-delivery object information to the terminal device.

Sixth Example of Second Embodiment

An information processing system includes a terminal device and a control device that controls power supply to the terminal device. The control device includes a power supply controller that is connectable to the terminal device via a cable, supplies power to the terminal device and communicates information with the terminal device via the cable, and determines a combination of a supply voltage and a supply current to the terminal device through communication with the terminal device via the cable; a reconnection controller that causes the power supply controller to disconnect power supply to and communication of information with the terminal device via the cable, and then reconnect power supply to and communication of information with the terminal device via the cable, in the case of changing the combination of the supply voltage and the supply current to the terminal device; and a profile changer that sets a power profile to the power supply controller in the case of changing the combination of the supply voltage and the supply current to the terminal device, the power profile representing the combination of a voltage and a current that are able to be supplied to the terminal device.

Seventh Example of Second Embodiment

A computer program product includes programmed instructions embodied in and stored on a non-transitory computer readable medium. The instructions are to be executed by a processor of a control device that controls power supply to a terminal device The control device includes a power supply controller that is connectable to the terminal device via a cable, supplies power to the terminal device and communicates information with the terminal device via the cable, and determines a combination of a supply voltage and a supply current to the terminal device through communication with the terminal device via the cable. When executed by the processor, the instructions cause the processor to function as a reconnection controller that causes the power supply controller to disconnect power supply to and communication of information with the terminal device via the cable, and then reconnect power supply to and communication of information with the terminal device via the cable, in the case of changing the combination of the supply voltage and the supply current to the terminal device; and a profile changer that sets a power profile to the power supply controller in the case of changing the combination of the supply voltage and the supply current to the terminal device, the power profile representing the combination of a voltage and a current that are able to be supplied to the terminal device.

Eighth Example of Second Embodiment

A container stores a plurality of terminal devices to be extractable by a user. The container includes a plurality of control devices each of which is connectable to any of the terminal devices via a cable, and controls power supply to the terminal device connected via the cable; and an information processing device that controls the control devices. The control devices each include a power supply controller that is connectable to the terminal device via a cable, supplies power to the terminal device and communicates information with the terminal device via the cable, and determines a combination of a supply voltage and a supply current to the terminal device through communication with the terminal device via the cable; a reconnection controller that causes the power supply controller to disconnect power supply to and communication of information with the terminal device via the cable, and then reconnect power supply to and communication of information with the terminal device via the cable, in response to receipt of a change command for changing the supply voltage and the supply current to the terminal device from the information processing device; and a profile changer that sets a power profile to the power supply controller in response to receipt of the change command, the power profile representing the combination of a voltage and a current that are able to be supplied to the terminal device. The information processing device gives the change command to the control devices to alternately charge part of the terminal devices in order.

The third embodiment can include the following examples.

First Example of Third Embodiment

A control device controls power supply to a terminal device. The control device includes that is connectable to the terminal device via a cable, supplies power to the terminal device and communicates information with the terminal device via the cable, and determines a combination of a supply voltage and a supply current to the terminal device through communication with the terminal device via the cable; a change-command acquirer that receives, from an information processing device, a change command for changing a supply voltage and a supply current to the terminal device; and a profile changer that sets a power profile to the power supply controller in response to receipt of the change command, the power profile representing the voltage and the current that are able to be supplied to the terminal device. The change-command acquirer rejects reception of the change command during execution of a power delivery sequence for determining a supply voltage and a supply current to the terminal device.

Second Example of Third Embodiment

According to the control device in the first example of the third embodiment, in the power delivery sequence, the power supply controller transmits, to the terminal device, power-delivery object information including one or more preset power profiles; receives, from the terminal device, a response indicating the power profile requested by the terminal device; and starts supplying power to the terminal device according to the power profile indicated by the response.

Third Example of Third Embodiment

According to the control device in the first or the second example of the third embodiment, after rejecting reception of the change command, the change-command acquirer returns, to the information processing device, notification information indicating the rejection of reception of the change command.

Fourth Example of Third Embodiment

The control device according to any of the first to the third examples of the third embodiment further includes a power supply manager that manages at least one of the power profiles used by the power supply controller which supplies power to the terminal device; and a change command mask that masks the change command during power supply according to a default power profile, in response to receipt of the change command for supplying power according to the default power profile, the default power profile defined by the standard.

Fifth Example of Third Embodiment

According to the control device in the fourth example of the third embodiment, the change command mask masks the change command during power supply at a non-default power profile, in response to receipt of the change command for supplying power at the non-default power profile, the non-default power profile defined by a standard defining specifications for power supply and communication of information using the cable.

Sixth Example of Third Embodiment

According to the control device in the fourth or the fifth example of the third embodiment, the default power profile indicates a combination of a minimum voltage and a minimum current among voltages and currents defined to be able to be supplied by the standard.

Seventh Example of Third Embodiment

An information processing system includes a terminal device; and a control device that controls power supply to the terminal device. The control device includes a power supply controller that is connectable to the terminal device via a cable, supplies power to the terminal device and communicates information with the terminal device via the cable, and determines a combination of a supply voltage and a supply current to the terminal device through communication with the terminal device via the cable; a change-command acquirer that receives, from an information processing device, a change command for changing a supply voltage and a supply current to the terminal device; and a profile changer that sets, to the power supply controller, a power profile indicating the voltage and the current that are able to be supplied to the terminal device, in response to receipt of the change command. The change-command acquirer rejects reception of the change command during execution of a power delivery sequence for determining a supply voltage and a supply current to the terminal device.

Eighth Example of Third Embodiment

A computer program product includes programmed instructions embodied in and stored on a non-transitory computer readable medium. The instructions are to be executed by a processor of a control device that controls power supply to a terminal device The control device includes a power supply controller that is connectable to the terminal device via a cable, supplies power to the terminal device and communicates information with the terminal device via the cable, and determines a combination of a supply voltage and a supply current to the terminal device through communication with the terminal device via the cable. When executed by the processor, the instructions cause the processor to function as a change-command acquirer that receives, from an information processing device, a change command for changing a supply voltage and a supply current to the terminal device; and a profile changer that sets a power profile to the power supply controller, in response to receipt of the change command, the power profile indicating a voltage and a current that are able to be supplied to the terminal device. The change-command acquirer rejects reception of the change command during execution of a power delivery sequence for determining a supply voltage and a supply current to the terminal device.

The fourth embodiment can include the following examples.

First Example of Fourth Embodiment

A control device controls power supply to a terminal device. The control device includes a power supply controller that is connectable to the terminal device via a cable, supplies power to the terminal device and communicates information with the terminal device via the cable, and determines a combination of a supply voltage and a supply current to the terminal device through communication with the terminal device via the cable; a reconnection controller that causes the power supply controller to disconnect power supply to and communication of information with the terminal device via the cable, and then reconnect power supply to and communication of information with the terminal device via the cable, in the case of changing the combination of a supply voltage and a supply current to the terminal device; a cable-status notifier that transmits notification information indicating a connection state of the cable to an information processing device, in response to a change in the connection state of the cable; and a notification mask that mask the notification information on the connection state of the cable to the information processing device during execution of a power delivery sequence for changing the combination of a supply voltage and a supply current to the terminal device.

Second Example of Fourth Embodiment

According to the control device in the first example of the fourth embodiment, after end of the power delivery sequence, the cable-status notifier transmits the notification information indicating the connection state of the cable to the information processing device, in response to a change in the connection state of the cable from before the power delivery sequence.

Third Example of Fourth Embodiment

According to the control device in the first or the second example of the fourth embodiment, the reconnection controller gives a reset instruction to the power supply controller to disconnect power supply to and communication of information with the terminal device via the cable, and gives a reset cancelling instruction to the power supply controller to reconnect power supply to and communication of information with the terminal device via the cable.

Fourth Example of Fourth Embodiment

An information processing system includes a terminal device; and a control device that controls power supply to the terminal device. The control device includes a power supply controller that is connectable to the terminal device via a cable, supplies power to the terminal device and communicates information with the terminal device via the cable, and determines a combination of a voltage and a current to be supplied to the terminal device through communication with the terminal device via the cable; a reconnection controller that causes the power supply controller to disconnect power supply to and communication of information with the terminal device via the cable, and then reconnect power supply to and communication of information with the terminal device via the cable, in the case of changing the combination of a supply voltage and a supply current to the terminal device; a cable-status notifier that transmits notification information indicating a connection state of the cable to an information processing device, in response to a change in the connection state of the cable; and a notification mask that masks the notification information on the connection state of the cable to the information processing device during execution of a power delivery sequence for changing the combination of a supply voltage and a supply current to the terminal device.

Fifth Example of Fourth Embodiment

A computer program product includes programmed instructions embodied in and stored on a non-transitory computer readable medium. The instructions are to be executed by a processor of a control device that controls power supply to a terminal device The control device includes a power supply controller that is connectable to the terminal device via a cable, supplies power to the terminal device and communicates information with the terminal device via the cable, and determines a combination of a supply voltage and a supply current to the terminal device through communication with the terminal device via the cable. When executed by the processor, the instructions cause the processor to function as: a reconnection controller that causes the power supply controller to disconnect power supply to and communication of information with the terminal device via the cable, and then reconnect power supply to and communication of information with the terminal device via the cable, in the case of changing the combination of a supply voltage and a supply current to the terminal device; a cable-status notifier that transmits notification information indicating a connection state of the cable to an information processing device, in response to a change in the connection state of the cable; and a notification mask that mask the notification information on the connection state of the cable to the information processing device during execution of a power delivery sequence for changing the combination of a supply voltage and a supply current to the terminal device.

Sixth Example of Fourth Embodiment

A control device controls power supply to a terminal device. The control device includes a power supply controller that is connectable to the terminal device via a cable, supplies power to the terminal device and communicates information with the terminal device via the cable, and determines a combination of a supply voltage and a supply current to the terminal device through communication with the terminal device via the cable; a reconnection controller that causes the power supply controller to disconnect power supply to and communication of information with the terminal device via the cable, and then reconnect power supply and communication of information with the terminal device via the cable, in the case of changing the combination of a supply voltage and a supply current to the terminal device; a cable-status notifier that transmits notification information indicating a connection state of the cable to an information processing device, in response to a change in the connection state of the cable; and a notification mask that prevents the cable-status notifier from transmitting the notification information on the connection state of the cable to the information processing device during execution of a power delivery sequence for changing the combination of a supply voltage and a supply current to the terminal device.

The fifth embodiment can include the following examples.

First Example of Fifth Embodiment

A terminal device is a computer portable by a user. The terminal device includes a power supply controller that is connectable to a device via a cable and supplied with power from the device, and communicates information with the device via the cable; a wireless communicator that is wirelessly connected to an access point to communicate information via a network; and an access-point controller that causes, when connected to a predefined control device via the cable, the wireless communicator to wirelessly connect to a first access point associated with the control device.

Second Example of Fifth Embodiment

According to the terminal device in the first example of the fifth embodiment, when disconnected from the control device via the cable, the access-point controller causes the wireless communicator to wirelessly connect to a predetermined second access point different from the first access point.

Third Example of Fifth Embodiment

According to the terminal device in the first example of the fifth embodiment, when disconnected from the control device via the cable, the access-point controller invalidates setting information for wirelessly connecting to the first access point set to the wireless communicator.

Fourth Example of Fifth Embodiment

The terminal device according to any of the first to third examples of the fifth embodiment further includes a device determiner that determines, when connected to the device via the cable, whether the device is the control device on the basis of information received via the cable.

Fifth Example of Fifth Embodiment

An information processing system includes a terminal device as a computer portable by a user; and a control device that controls power supply to the terminal device. The terminal device includes a power supply controller that is connectable to a device via a cable and is supplied with power from the device, and communicates information with the device via the cable; a wireless communicator that is wirelessly connected to an access point to communicate information via a network; and an access-point controller that causes, when connected to a predefined control device via the cable, the wireless communicator to wirelessly connect to a first access point associated with the control device.

Sixth Example of Fifth Embodiment

A computer program product includes programmed instructions embodied in and stored on a non-transitory computer readable medium. The instructions are to be executed by a processing circuit of a terminal device serving as a computer portable by a user. The terminal device includes a power supply controller that is connectable to a device via a cable and supplied with power from the device, and communicates information with the device via the cable; and a wireless communicator that is wirelessly connected to an access point to communicate information via a network. When executed by the processing circuit, the instructions cause the processing circuit to function as an access-point controller that that causes, when connected to a predefined control device via the cable, the wireless communicator to wirelessly connect to a first access point associated with the control device.

What is claimed is:

1. A terminal device serving as a computer portable by a user, the terminal device comprising:
    a power supply controller that connects to a device via a cable and supplied with power from the device, and communicates information with the device via the cable;
    a wireless communicator that is wirelessly connected to an access point to communicate information via a network; and
    an access-point controller that causes, when connected to a predefined control device via the cable, the wireless communicator to wirelessly connect to a first access point associated with the control device.

2. The terminal device according to claim 1, wherein when disconnected from the control device via the cable, the access-point controller causes the wireless communicator to wirelessly connect to a predetermined second access point different from the first access point.

3. The terminal device according to claim 1, wherein when disconnected from the control device via the cable, the access-point controller invalidates setting information for wirelessly connecting to the first access point set to the wireless communicator.

4. The terminal device according to claim 1, further comprising
    a device determiner that determines, when connected to the device via the cable, whether the device is the control device based on information received via the cable.

5. An information processing system comprising:
    a terminal device serving as a computer portable by a user; and
    a control device that controls power supply to the terminal device, wherein
    the terminal device comprises
        a power supply controller that connects to a device via a cable and is supplied with power from the device, and communicates information with the device via the cable;
        a wireless communicator that is wirelessly connected to an access point to communicate information via a network; and
        an access-point controller that causes, when connected to a predefined control device via the cable, the wireless communicator to wirelessly connect to a first access point associated with the control device.

6. A computer program product including programmed instructions embodied in and stored on a non-transitory computer readable medium, the instructions to be executed by processing circuitry of a terminal device serving as a computer portable by a user, the terminal device comprising a power supply controller that is connectable to a device via a cable and supplied with power from the device, and communicates information with the device via the cable; and a wireless communicator that is wirelessly connected to an access point to communicate information via a network, wherein when executed by the processing circuitry, the instructions cause the processing circuitry to function as:
   an access-point controller that that causes, when connected to a predefined control device via the cable, the wireless communicator to wirelessly connect to a first access point associated with the control device.

* * * * *